United States Patent
Yasugi et al.

(10) Patent No.: US 11,818,363 B2
(45) Date of Patent: Nov. 14, 2023

(54) VIDEO DECODING APPARATUS AND VIDEO CODING APPARATUS

(71) Applicant: Sharp Kabushiki Kaisha, Sakai (JP)

(72) Inventors: Yukinobu Yasugi, Sakai (JP); Eiichi Sasaki, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/095,011

(22) Filed: Jan. 10, 2023

(65) Prior Publication Data

US 2023/0164327 A1     May 25, 2023

Related U.S. Application Data

(63) Continuation of application No. 17/486,592, filed on Sep. 27, 2021, now Pat. No. 11,589,056, which is a continuation of application No. 17/017,743, filed on Sep. 11, 2020, now Pat. No. 11,184,622.

(30) Foreign Application Priority Data

Sep. 18, 2019    (JP) ................. 2019-169444
Sep. 20, 2019    (JP) ................. 2019-171549

(51) Int. Cl.
| | | |
|---|---|---|
| H04N 19/59 | (2014.01) | |
| H04N 19/159 | (2014.01) | |
| H04N 19/132 | (2014.01) | |
| H04N 19/176 | (2014.01) | |
| H04N 19/426 | (2014.01) | |

(52) U.S. Cl.
CPC ......... *H04N 19/159* (2014.11); *H04N 19/132* (2014.11); *H04N 19/176* (2014.11); *H04N 19/426* (2014.11); *H04N 19/59* (2014.11)

(58) Field of Classification Search
CPC .. H04N 19/159; H04N 19/132; H04N 19/176; H04N 19/426; H04N 19/59
USPC .................................. 375/240.12
See application file for complete search history.

(56) References Cited

PUBLICATIONS

Yasugi et al., "Video Decoding Apparatus and Video Coding Apparatus", U.S. Appl. No. 17/486,592, filed Sep. 27, 2021.

*Primary Examiner* — Nguyen T Truong
(74) *Attorney, Agent, or Firm* — KEATING & BENNETT, LLP

(57) ABSTRACT

A video decoding apparatus includes matrix reference pixel derivation circuitry that derives reference samples by using top neighboring samples and left neighboring samples of a current block, weight matrix derivation circuitry that derives a weight matrix, matrix prediction image derivation circuitry that derives a prediction image, and matrix prediction image interpolation circuitry that derives a predicted image by using the prediction image. A size index is derived according to a value of a target block width and a value of a target block height. A prediction size is derived using the size index. In a case that a first condition, that both the value of the transform block width and the value of the transform block height are equal to 4, is true, the size index is set equal to 0 and the prediction size is set equal to 4.

3 Claims, 22 Drawing Sheets

| sizeId | numModes | boundarySize | predW | predH | predC | inSize |
|---|---|---|---|---|---|---|
| 0 | 35 | 2 | 4 | 4 | 4 | 4 |
| 1 | 19 | 4 | 4 | 4 | 4 | 8 |
| 2 | 11 | 4 | min(nTbW, 8) | min(nTbH, 8) | 8 | 7 |

FIG. 17

|  |  | nTbW | | | |
|---|---|---|---|---|---|
|  |  | 4 | 8 | 16 | 32 |
| nTbH | 4 | 0 | 1 | 2 | – |
|  | 8 | 1 | 1 | 2 | 2 |
|  | 16 | 2 | 2 | 2 | 2 |
|  | 32 | – | 2 | 2 | 2 |

FIG. 18

| sizeId | numModes | boundarySize | predSize | inSize |
|---|---|---|---|---|
| 0 | 35 | 2 | 4 | 4 |
| 1 | 19 | 4 | 4 | 8 |
| 2 | 11 | 4 | 8 | 7 |

FIG. 19

|  |  | nTbW | | | |
|---|---|---|---|---|---|
|  |  | 4 | 8 | 16 | 32 |
| nTbH | 4 | 0 | 1 | 1 | – |
|  | 8 | 1 | 1 | 2 | 2 |
|  | 16 | 1 | 2 | 2 | 2 |
|  | 32 | – | 2 | 2 | 2 |

FIG. 20

|  |  | nTbW | | | |
|---|---|---|---|---|---|
|  |  | 4 | 8 | 16 | 32 |
| nTbH | 4 | 0 | 1 | 1 | – |
|  | 8 | 1 | 2 | 2 | 2 |
|  | 16 | 1 | 2 | 2 | 2 |
|  | 32 | – | 2 | 2 | 2 |

|  |  | nTbW | | | |
|---|---|---|---|---|---|
|  |  | 4 | 8 | 16 | 32 |
| nTbH | 4 | 0 | 1 | 1 | – |
|  | 8 | 1 | 1 | 1 | 1 |
|  | 16 | 1 | 1 | 2 | 2 |
|  | 32 | – | 1 | 2 | 2 |

FIG. 21

|  | nTbW | | | |
|---|---|---|---|---|
|  | 4 | 8 | 16 | 32 |
| nTbH 4 | 0 | 0 | 0 | - |
| nTbH 8 | 0 | 2 | 2 | 2 |
| nTbH 16 | 0 | 2 | 2 | 2 |
| nTbH 32 | - | 2 | 2 | 2 |

|  | nTbW | | | |
|---|---|---|---|---|
|  | 4 | 8 | 16 | 32 |
| nTbH 4 | 1 | 1 | 1 | - |
| nTbH 8 | 1 | 2 | 2 | 2 |
| nTbH 16 | 1 | 2 | 2 | 2 |
| nTbH 32 | - | 2 | 2 | 2 |

FIG. 22

VIDEO DECODING APPARATUS AND VIDEO CODING APPARATUS

CROSS-REFERENCE TO RELATED APPLICATIONS

This application claims the benefit of priority to U.S. application Ser. No. 17/017,743 filed on Sep. 11, 2020 and Japanese Patent Applications Numbered 2019-169444 and 2019-171549 filed on Sep. 18, 2019 and Sep. 20, 2019, respectively. The entire contents of each of the above-identified applications are hereby incorporated by reference.

BACKGROUND

Technical Field

Embodiments of the present disclosure relate to a video decoding apparatus and a video coding apparatus.

A video coding apparatus which generates coded data by coding a video, and a video decoding apparatus which generates decoded images by decoding the coded data are used for efficient transmission or recording of videos.

Examples of specific video coding schemes include schemes proposed in H.264/AVC and High-Efficiency Video Coding (HEVC).

In such a video coding scheme, images (pictures) constituting a video are managed in a hierarchical structure including slices obtained by splitting an image, Coding Tree Units (CTUs) obtained by splitting a slice, units of coding (Coding Units; which may be referred to as CUs) obtained by splitting a coding tree unit, and Transform Units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (an inter-prediction) and an intra-picture prediction (intra prediction).

An example of a recent technology for video coding and decoding is "Versatile Video Coding (Draft 6)", JVET-O2001-vE, Joint Video Exploration Team (JVET) of ITU-T SG 16 WP 3 and ISO/IEC JTC 1/SC 29/WG 11. In "CE 3: Affine linear weighted intra prediction (CE3-4.1, CE3-4.2)", JVET-N0217-v1, Joint Video Exploration Team (JVET) of ITU-T SG 16 WP 3 and ISO/IEC JTC 1/SC 29/WG 11, a Matrix-based Intra Prediction (MIP) technology is disclosed in which a prediction image is derived by a product-sum operation performed on a weight matrix and a reference image derived from an adjacent image.

SUMMARY

In matrix intra predictions such as "Versatile Video Coding (Draft 6)", JVET-O2001-vE, Joint Video Exploration Team (JVET) of ITU-T SG 16 WP 3 and ISO/IEC JTC 1/SC 29/WG 11, and "CE3: Affine linear weighted intra prediction (CE3-4.1, CE3-4. 2)", JVET-N0217-v1, Joint Video Exploration Team (JVET) of ITU-T SG 16 WP 3 and ISO/IEC JTC 1/SC 29/WG 11, different weight matrices are held depending on the size of multiple blocks and an intra prediction mode, and thus there is a problem in that a memory holding the weight matrices has a large size. There is also a problem in that the amount of processing for generating the prediction image is large.

An object of the present disclosure is to perform preferable intra prediction while reducing the size of the memory for the weighting matrices, and to reduce the amount of processing.

In order to solve the above problem, a video decoding apparatus according to an aspect of the present disclosure includes: a matrix reference pixel derivation unit configured to derive, as a reference image, an image obtained by down-sampling an image adjacently above a target block and an image adjacently leftward of the target block; a weight matrix derivation unit configured to derive a matrix of weighting factors in accordance with an intra prediction mode and a target block size; a matrix prediction image derivation unit configured to derive a prediction image by using a product of elements of the reference image and elements of the matrix of the weighting factors; and a matrix prediction image interpolation unit deriving, as a prediction image, the prediction image or an image obtained by interpolating the prediction image, wherein the weight matrix derivation unit derives a matrix with a size of a width equal to or smaller than a width of the target block size and a height equal to or smaller than a height of the target block size.

The weight matrix derivation unit derives a matrix with a size of 4×4 in a case that one side of the target block is 4.

The weight matrix derivation unit derives a matrix with a size of 4×4 in a case that the target block size is 4×16 and in a case that the target block size is 16×4.

The weight matrix derivation unit derives one of a matrix with a size of 4×4 and sizeId=0, 1 and a matrix with a size of 8×8 and sizeId=2, and derives a matrix with sizeId=1 or 2 in a case that one side of the target block is 4.

The weight matrix derivation unit may derive a matrix with a size of 4×4 in a case that a product of a width and a height of the target block size is equal to or smaller than 64.

The matrix prediction image derivation unit derives an intermediate prediction image predMip [ ][ ] shaped in a square whose width and height are equal.

A video coding apparatus includes: a matrix reference pixel derivation unit configured to derive, as a reference image, an image obtained by down-sampling an image adjacently above a target block and an image adjacently leftward of the target block; a weight matrix derivation unit configured to derive a matrix of weighting factors in accordance with an intra prediction mode and a target block size; a matrix prediction image derivation unit configured to derive a prediction image by using a product of elements of the reference image and elements of the matrix of the weighting factors; and a matrix prediction image interpolation unit deriving, as a prediction image, the prediction image or an image obtained by interpolating the prediction image, wherein the weight matrix derivation unit derives a matrix with a size of a width equal to or smaller than a width of the target block size and a height equal to or smaller than a height of the target block size.

The weight matrix derivation unit derives a matrix with a size of 4×4 in a case that one side of the target block is 4.

The weight matrix derivation unit derives a matrix with a size of 4×4 in a case that the target block size is 4×16 and in a case that the target block size is 16×4.

The weight matrix derivation unit derives one of a matrix with a size of 4×4 and sizeId=0, 1 and a matrix with a size of 8×8 and sizeId=2, and derives a matrix with sizeId=1 or 2 in a case that one side of the target block is 4.

The weight matrix derivation unit may derive a matrix with a size of 4×4 in a case that a product of a width and a height of the target block size is equal to or smaller than 64.

The matrix prediction image derivation unit derives an intermediate prediction image predMip [ ][ ] shaped in a square whose width and height are equal.

According to one aspect of the present disclosure, a preferable intra prediction can be performed with a reduction in the size of the memory for the weight matrix or a reduction of the amount of processing.

BRIEF DESCRIPTION OF DRAWINGS

The disclosure will be described with reference to the accompanying drawings, wherein like numbers reference like elements.

FIG. 17 is a diagram illustrating parameters for prediction image generation in a case that deriving predMip with a non-square by using MIP.

FIG. 18 is a diagram illustrating a method for deriving sizeId according to an embodiment of the present disclosure (MIP Example 1).

FIG. 19 is a diagram illustrating parameters for prediction image generation in a case that a square predMip is derived by using MIP.

FIG. 20 is a diagram illustrating a method for deriving sizeId according to an embodiment of the present disclosure (MIP Example 2).

FIG. 21 is a diagram illustrating a method for deriving sizeId according to an embodiment of the present disclosure (MIP Example 3).

FIG. 22 is a diagram illustrating a method for deriving sizeId according to an embodiment of the present disclosure (MIP Example 4).

DESCRIPTION OF EMBODIMENTS

First Embodiment

Hereinafter, embodiments of the present disclosure will be described with reference to the drawings.

Figure 1:
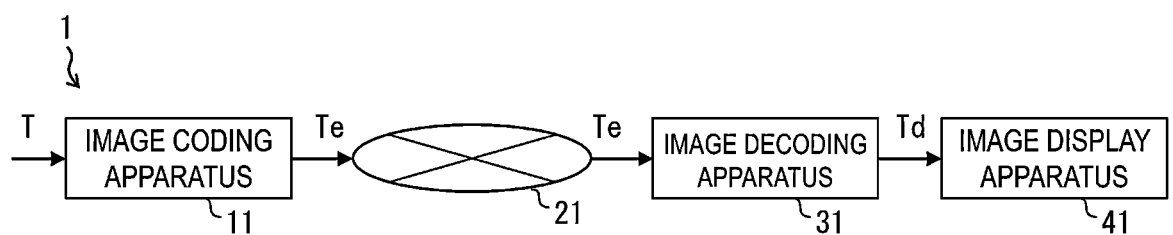
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system transmitting a coding stream obtained by coding an image to be coded, decoding the transmitted coding stream, and display an image. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits, to the video decoding apparatus 31, a coding stream Te generated by the video coding apparatus 11. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD, trade name) or a Blue-ray Disc (BD, trade name).

The video decoding apparatus 31 decodes each of the coding streams Te transmitted by the network 21 and generates one or more decoded images Td.

The video display apparatus 41 displays all or part of the one or more decoded images Td generated by the video decoding apparatus 31. The video display apparatus 41 includes a display device, for example, a liquid crystal display or an organic Electro-luminescence (EL) display. Forms of display include a stationary display, a mobile display, an HMD, and the like. The video decoding apparatus 41 displays images with high image quality in a case that the video decoding apparatus 31 has high processing capability, and displays images not requiring high processing capability or display capability in a case that the video decoding apparatus 31 has only low processing capability.

Operator

Operators used in the present specification will be described below.

$>>$ is a right bit shift, $<<$ is a left bit shift, & is a bitwise AND, | is a bitwise OR, |= is an OR assignment operator, and || is a logical OR.

x?y:z is a ternary operator to take y in a case that x is true (other than 0) and take z in a case that x is false (0).

Clip3(a, b, c) is a function that clips c to a value equal to or greater than a and equal to or smaller than b, returns a in a case that c<a, returns b in a case that c>b, and returns c in other cases (provided that a<=b).

Clip1Y(c) is an operator set to a=0 and b=(1<<BitDepthY)−1 in a Clip3(a, b, c). BitDepthY is the bit depth of luminance.

abs(a) is a function that returns the absolute value of a.

Int(a) is a function that returns an integer value of a.

floor(a) is a function that returns a maximum integer equal to or smaller than a.

ceil(a) is a function that returns a minimum integer equal to or greater than a.

a/d represents the division of a by d (with fractional portions omitted).

min(a, b) is a function that returns the smaller of the values a and b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
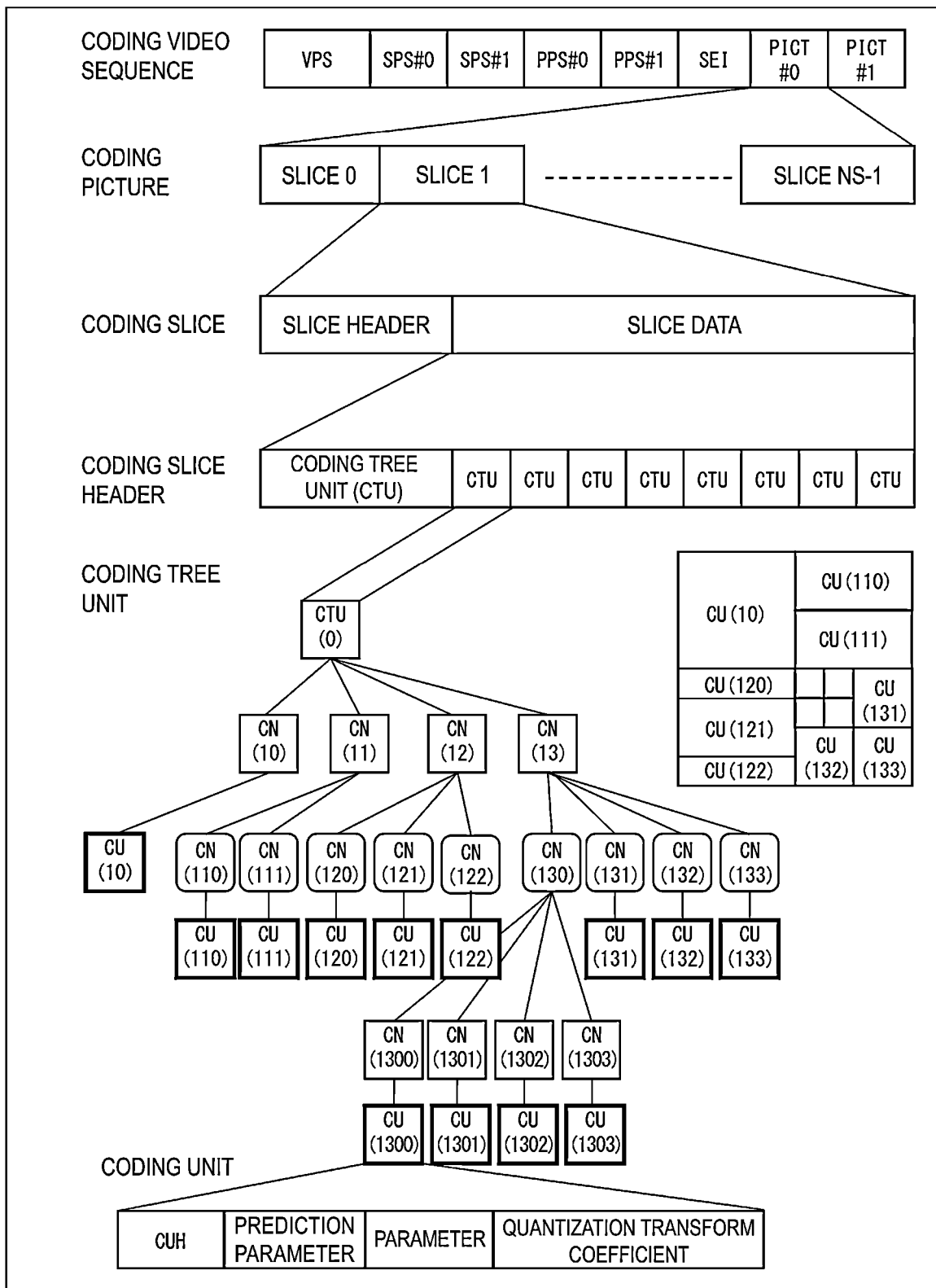
FIG. 4 is a diagram illustrating a hierarchical structure of data of a coding stream according to the present embodiment.

FIG. 4 is a diagram illustrating a hierarchical structure of data of the coding stream Te. The coding stream Te includes a sequence and multiple pictures constituting the sequence illustratively. FIG. 4 illustrates a diagram illustrating a coding video sequence defining a sequence SEQ, a coding picture prescribing a picture PICT, a coding slice prescribing a slice S, a coding slice data prescribing slice data, a coding tree unit included in the coding slice data, and a coding unit (CU) included in each coding tree unit, respectively.

Coding Video Sequence

For the coding video sequence, a set of data is defined that is referenced by the video decoding apparatus 31 to decode the sequence SEQ to be processed. As illustrated in the coding video sequence of FIG. 4, the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

For the sequence parameter set SPS, a set of coding parameters is defined that is referenced by the video decoding apparatus 31 to decode a target sequence. For example, a width and a height of a picture are defined. Note that multiple SPSs may exist. In that case, any of multiple SPSs is selected from the PPS.

For the picture parameter set PPS, a set of coding parameters is defined that is referenced by the video decoding apparatus 31 to decode each picture in a target sequence. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

For the coding picture, a set of data is defined that is referenced by the video decoding apparatus 31 to decode the picture PICT to be processed. As illustrated in the coding picture in FIG. 4, the picture PICT includes slices 0 to NS−1 (NS is the total number of slices included in the picture PICT).

Note that, in the description below, in a case that the slices 0 to NS−1 need not be distinguished from one another, subscripts of reference signs may be omitted. The same applies to other data with subscripts included in the coding stream Te which will be described below.

Coding Slice

For the coding slice, a set of data is defined that is referenced by the video decoding apparatus 31 to decode the slice S to be processed. As illustrated in the coding slice in FIG. 4, the slice includes a slice header and slice data.

The slice header SH includes a coding parameter group referenced by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction or a bi-prediction and may generate a prediction image using more reference pictures. Hereinafter, references of a P slice and a B slice indicate slices including blocks for which the inter prediction can be used.

Note that, the slice header may include a reference to the picture parameter set PPS (pic_parameter_set_id).

Coding Slice Data

For the coding slice data, a set of data is defined that is referenced by the video decoding apparatus 31 to decode slice data to be processed. The slice data includes a CTU, as illustrated in the coding slice header in FIG. 4. A CTU is a block of a fixed size (for example, 64×64) constituting a slice, and may be called a Largest Coding Unit (LCU).

Coding Tree Unit

For the coding tree unit in FIG. 4, a set of data is defined that is referenced by the video decoding apparatus 31 to decode a CTU to be processed. The CTU is split into coding units CU, which are basic units of coding processing, by recursive Quad Tree split (QT split), Binary Tree split (BT split) or Ternary Tree split (TT split). The BT split and the TT split are collectively referred to as a Multi Tree split (MT split). Nodes of a tree structure obtained by recursive quad tree split are referred to as Coding Nodes (CNs). Intermediate nodes of a quad tree, a binary tree, and a ternary tree are coding nodes, and the CTU itself is also defined as the highest coding node.

CT is the CT information, a QT split flag (cu_split_flag) indicating whether to perform QT split or not, an MT split flag (split_mt_flag) indicating the presence or absence of MT split, an MT split direction (split_mt_dir) indicating the split direction of the MT split, and an MT split type (split_mt_type) indicating the MT split type. cu_split_flag, split_mt_flag, split_mt_dir, and split_mt_type are transmitted for each coding node.

Figure 5:
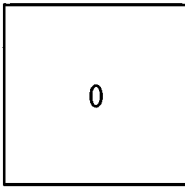
FIG. 5 is a diagram illustrating a split example of the CTU.

In a case that cu_split_flag is 1, the coding node is split into four coding nodes (QT in FIG. 5).

In cu_split_flag being 0, in a case that split_mt_flag is 0, the coding node is not split and includes one coding unit CU as a node (split in FIG. 5 is not performed). The CU is a terminal node of the coding nodes and is not split any further. The CU is a basic unit of coding processing.

In a case that split_mt_flag is 1, the coding node is subjected to MT split as follows. In split_mt_type being 0, in a case that split_mt_dir is 1, the coding node is horizontally split into two coding nodes (BT (horizontal split) in FIG. 5). In a case that split_mt_dir is 0, the coding node is vertically split into two coding nodes (BT (vertical split) in FIG. 5). In split_mt_type being 1, in a case that split_mt_dir is 1 (TT (horizontal split) in FIG. 5), the coding node is horizontally split into three coding nodes. In a case that split_mt_dir is 0, the coding node is vertically split into three coding nodes (TT (vertical split) in FIG. 5). These are illustrated in the CT information of FIG. 5.

In a case that the size of the CTU is 64×64 pixels, the size of the CU can take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in the coding unit in FIG. 4, a set of data is defined that is referenced by the video decoding apparatus 31 to decode the coding unit to be processed. Specifically, the CU includes a CU header CUH, a prediction parameter, a conversion parameter, a quantization transform coefficient, and the like. For the CU header, a prediction mode, and the like are defined.

The prediction processing may be performed in units of CUs or in units of sub-CUs into which the CU is further split. In a case that the size of the CU is equal to the size of the sub-CU, the number of sub-CUs in the CU is one. In a case that the size of the CU is larger than the sub-CU size, the CU is split into sub-CUs. For example, in a case that the CU is 8×8 and the sub-CU is 4×4, the CU is split into four sub-CUs including two horizontal sub-CUs and two vertical sub-CUs.

There are two types of prediction (prediction modes): intra prediction and inter prediction. The intra prediction refers to a prediction in an identical picture, and the inter prediction refers to prediction processing performed between different pictures (for example, between pictures of different display times, and between pictures of different layer images).

Conversion and quantization processing are performed in units of CUs, and a quantization transform coefficient may be entropy-coded in units of sub-blocks such as 4×4.

Prediction Parameter

The prediction image is derived based on a prediction parameter associated with the block. The prediction parameter is classified into a prediction parameter for intra prediction and a prediction parameter for inter prediction.

Figure 6:
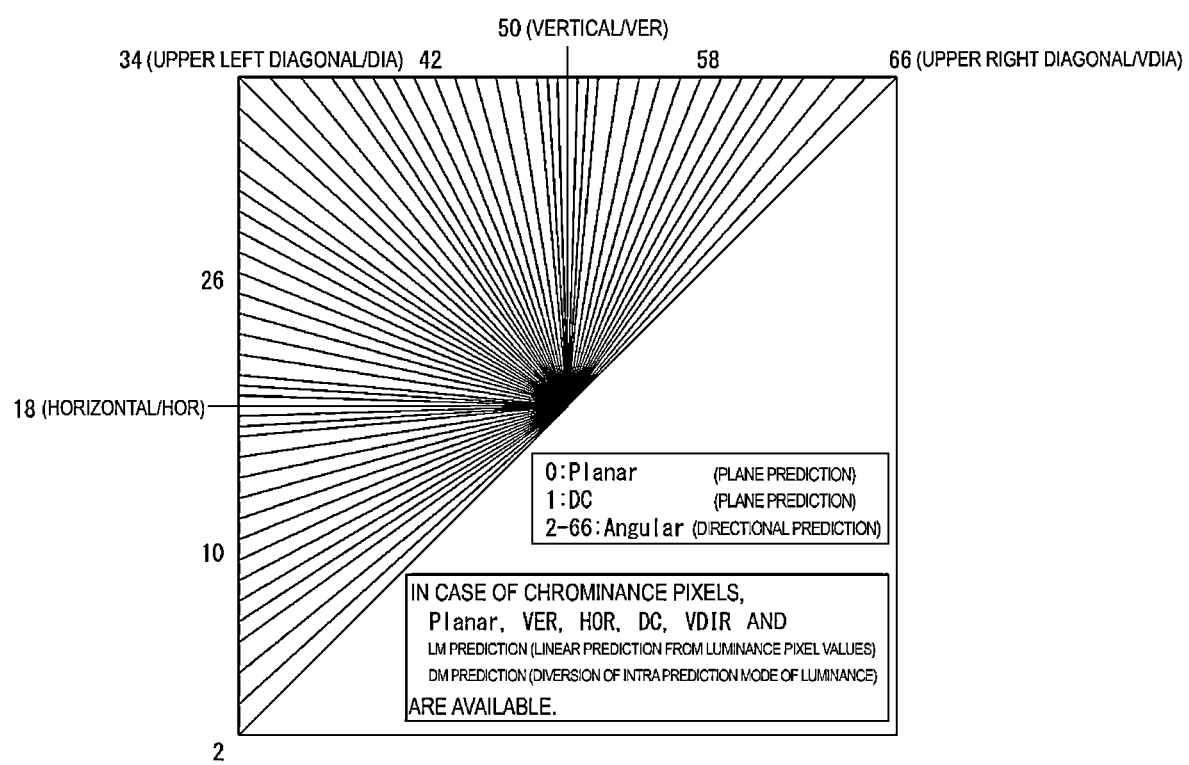
FIG. 6 is a schematic diagram indicating types (mode numbers) of an intra prediction mode.

The prediction parameter for intra prediction (intra prediction parameter) will be described below. The intra prediction parameter includes a luminance prediction mode IntraPredModeY and a chrominance prediction mode IntraPredModeC. FIG. 6 is a schematic diagram indicating types (mode numbers) of intra prediction modes. As illustrated in FIG. 6, there are, for example, 67 types (0 to 66) of intra prediction modes. The intra prediction modes include, for example, a planar prediction (0), a DC prediction (1), and Angular predictions (2 to 66). Furthermore, for chrominance, LM modes (67 to 72) may be added.

Syntax components for deriving the intra prediction parameter include, for example, intra_luma_mpm_flag, intra_luma_mpm_idx, intra_luma_mpm_remainder, and the like.

MPM intra_luma_mpm_flag is a flag indicating whether IntraPredModeY of a target block matches a Most Probable Mode (MPM). The MPM is a prediction mode included in an MPM candidate list mpmCandList [ ]. The MPM candidate list is a list that stores candidates that are estimated to be likely to be applied to the target block from the intra prediction mode of the adjacent block and a prescribed intra prediction mode. In a case that intra_luma_mpm_flag is 1, the IntraPredModeY of the target block is derived by using the MPM candidate list and the index intra_luma_mpm_idx.

$$IntraPredModeY=mpmCandList[intra\_luma\_mpm\_idx]REM$$

In a case that the intra_luma_mpm_flag is 0, the intra prediction mode is selected from the remaining modes RemIntraPredMode resulting from exclusion, from all the intra prediction modes, of the intra prediction modes included in the MPM candidate list X. The intra prediction mode which is selectable as RemIntraPredMode is referred to as "non-MPM" or "REM". RemIntraPredMode is derived using the intra_luma_mpm_remainder.

Configuration of Video Decoding Apparatus

Figure 7:
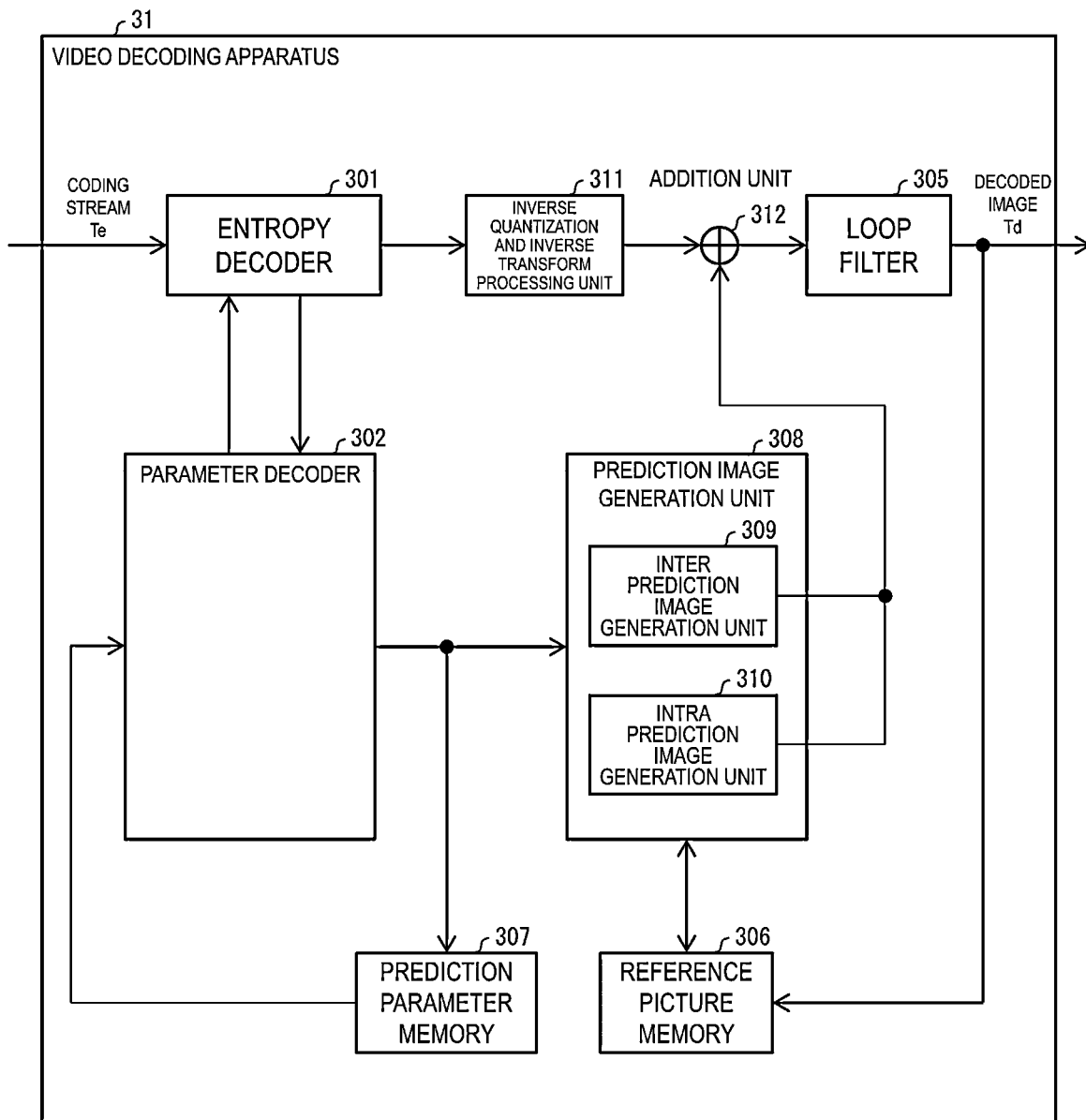
FIG. 7 is a schematic diagram illustrating a configuration of the video decoding apparatus.

Next, a configuration of the video decoding apparatus 31 (FIG. 7) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that the loop filter 305 may be omitted from the video decoding apparatus 31 in conformity with the video coding apparatus 11 described below.

The parameter decoder 302 includes an inter prediction parameter decoder 303 and an intra prediction parameter decoder 304 not illustrated. The prediction image generation unit 308 includes an inter prediction image generation unit 309 and an intra prediction image generation unit 310.

An example in which CTUs and CUs are used as units of processing will be described below, but the present disclosure is not limited to this example, and processing may be performed in units of sub-CUs. Alternatively, the CTUs and CUs may be replaced with blocks, the sub-CUs may be replaced with sub-blocks, and the processing may be performed in units of blocks or sub-blocks.

The entropy decoder 301 performs entropy decoding on the coding stream Te input from the outside and separates and decodes individual codes (syntax components). Entropy coding is classified into a scheme in which syntax components are variable-length-coded by using a context (probability model) adaptively selected depending on the type of the syntax components or the surrounding situation, and a scheme in which a syntax component is variable-length-coded by using a predetermined table or calculation formula. The former Context Adaptive Binary Arithmetic Coding (CABAC) stores, in a memory, the updated probability model for each coded or decoded picture (slice). As an initial state of the context of the P picture or the B picture, a probability model of the picture using a quantization parameter with the same slice type and the same slice level is set from among the probability models stored in the memory. This initial state is used for coding and decoding processing. Separated codes include prediction information used to generate a prediction image and a prediction error used to generate a difference image.

The entropy decoder 301 outputs the separated codes to the parameter decoder 302. Which code is to be decoded is controlled based on an indication of the parameter decoder 302.

Configuration of Intra Prediction Parameter Decoder 304

Based on the code input from the entropy decoder 301, the intra prediction parameter decoder 304 references the prediction parameter stored in the prediction parameter memory 307 to decode the intra prediction parameter, for example, the intra prediction mode IntraPredMode. The intra prediction parameter decoder 304 outputs a decoded intra prediction parameter to the prediction image generation unit 308, and also stores the decoded intra prediction parameter in the prediction parameter memory 307. The intra prediction parameter decoder 304 may derive different intra prediction modes depending on luminance and chrominance.

Figure 8:
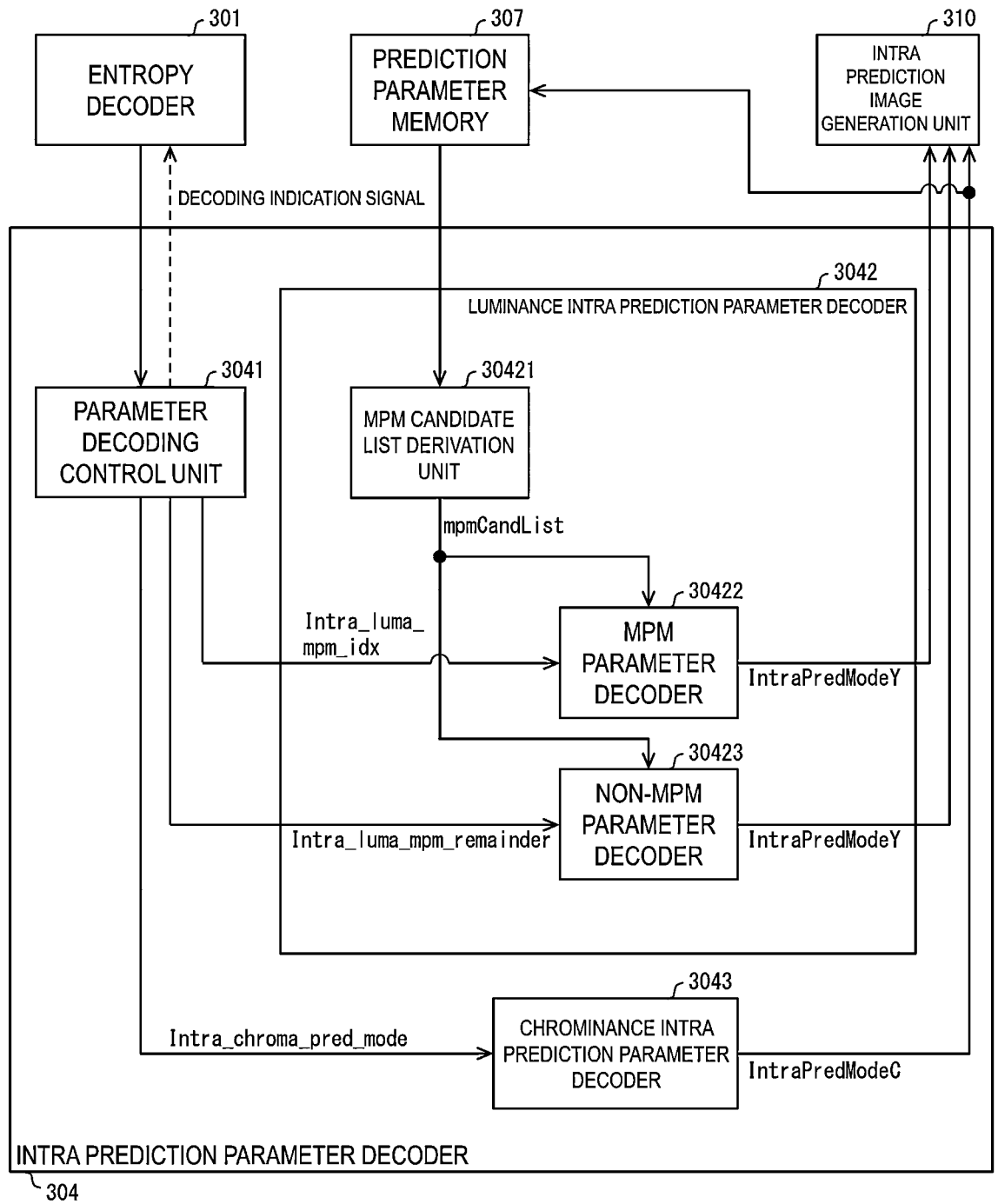
FIG. 8 is a schematic diagram illustrating a configuration of an intra prediction parameter decoder.

FIG. 8 is a schematic diagram illustrating a configuration of the intra prediction parameter decoder 304 of the parameter decoder 302. As illustrated in FIG. 8, the intra prediction parameter decoder 304 includes a parameter decoding control unit 3041, a luminance intra prediction parameter decoder 3042, and a chrominance intra prediction parameter decoder 3043.

The parameter decoding control unit 3041 instructs the entropy decoder 301 to decode the syntax component, and receives the syntax component from the entropy decoder 301. In a case that intra_luma_mpm_flag is 1, the parameter decoding control unit 3041 outputs intra_luma_mpm_idx to an MPM parameter decoder 30422 in the luminance intra prediction parameter decoder 3042. In a case that intra_luma_mpm_flag is 0, the parameter decoding control unit 3041 outputs intra_luma_mpm_remainder to a non-MPM parameter decoder 30423 of the luminance intra prediction parameter decoder 3042. The parameter decoding control unit 3041 outputs a syntax component of a chrominance intra prediction parameter to the chrominance intra prediction parameter decoder 3043.

The luminance intra prediction parameter decoder 3042 is configured to include the MPM candidate list derivation unit 30421, the MPM parameter decoder 30422, and the non-MPM parameter decoder 30423 (a decoder, a derivation unit).

The MPM parameter decoder 30422 references mpmCandList[ ] derived by the MPM candidate list derivation unit 30421 and intra_luma_mpm_idx to derive IntraPredModeY, and outputs IntraPredModeY to the intra prediction image generation unit 310.

The non-MPM parameter decoder 30423 derives RemIntraPredMode from mpmCandList[ ] and intra_luma_mpm_remainder and outputs IntraPredModeY to the intra prediction image generation unit 310.

The chrominance intra prediction parameter decoder 3043 derives IntraPredModeC from the syntax component of the chrominance intra prediction parameter, and outputs the derived IntraPredModeC to the intra prediction image generation unit 310.

The loop filter 305 is a filter provided in a coding loop to remove block distortion and ringing distortion and improve image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores the prediction parameter in a position predetermined for each CTU or CU to be decoded. Specifically, the prediction parameter memory 307 stores a parameter decoded by the parameter decoder 302 and a prediction mode predMode separated by the entropy decoder 301.

The prediction image generation unit 308 receives input of the prediction mode predMode, the prediction parameter, and the like. The prediction image generation unit 308 reads a reference picture from the reference picture memory 306. In the prediction mode indicated by the prediction mode predMode, the prediction image generation unit 308 generates a prediction image of a block or a sub-block by using the prediction parameter and the read reference picture (reference picture block). Here, the reference picture block refers to a set of pixels (referred to as a block because the set is normally rectangular) on a refers to picture and is a region that is referenced to generate a prediction image.

Intra Prediction Image Generation Unit 310

In a case that the prediction mode predMode indicates an intra prediction mode, the intra prediction image generation unit 310 performs intra prediction by using the intra prediction parameter input from the intra prediction parameter decoder 304 and a reference pixel read from the reference picture memory 306.

Specifically, the intra prediction image generation unit 310 reads, from the reference picture memory 306, an adjacent block located on the target picture and within a preset range from the target block. The predetermined range includes adjacent blocks located to the left, at the upper left, above, and at the upper right of the target block, and the referenced area varies depending on the intra prediction mode.

The intra prediction image generation unit 310 references a read decoded pixel value and the prediction mode indicated by IntraPredMode to generate a prediction image of the target block. The intra prediction image generation unit 310 outputs the generated prediction image of the block to the addition unit 312.

Figure 9:
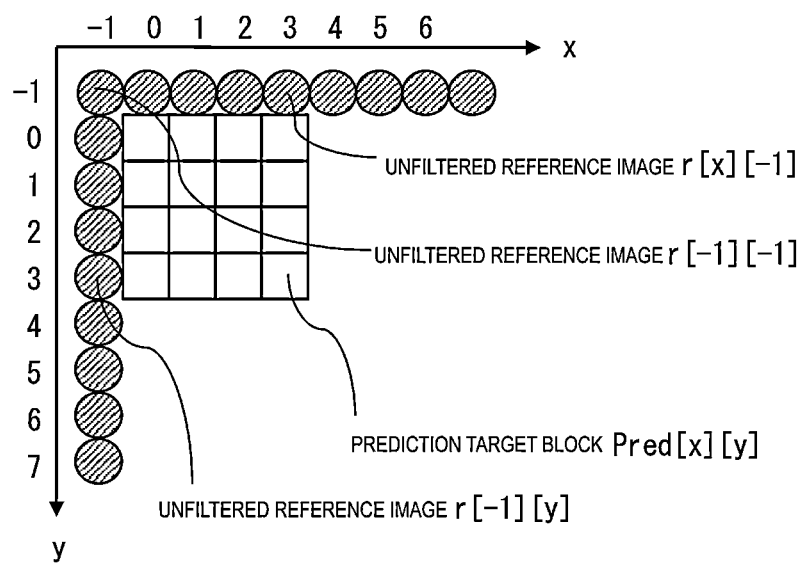
FIG. 9 is a diagram illustrating a reference region used for intra prediction.
Figure 9:
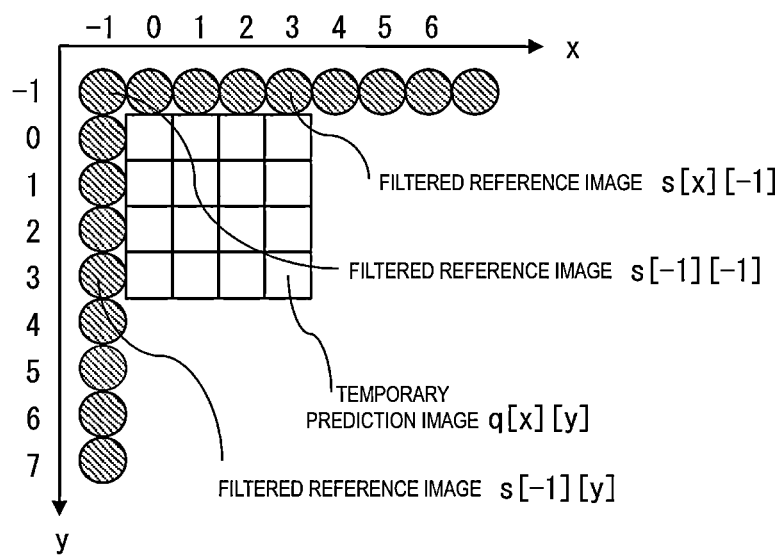

The generation of the prediction image based on the intra prediction mode will be described below. In the Planar prediction, the DC prediction, and the Angular prediction, a decoded peripheral region adjacent to (proximate to) the prediction target block is set as a reference region R. Then, the pixels on the reference region R are extrapolated in a particular direction to generate a prediction image. For example, the reference region R may be set as an L-shaped region (e.g., a region indicated by the shaded circle pixels in Example 1 of the reference area in FIG. 9) including portions to the left of and above (or further at the upper left of, at the upper right of, and at the lower left of) the prediction target block.

Details of Prediction Image Generation Unit

Figure 10:
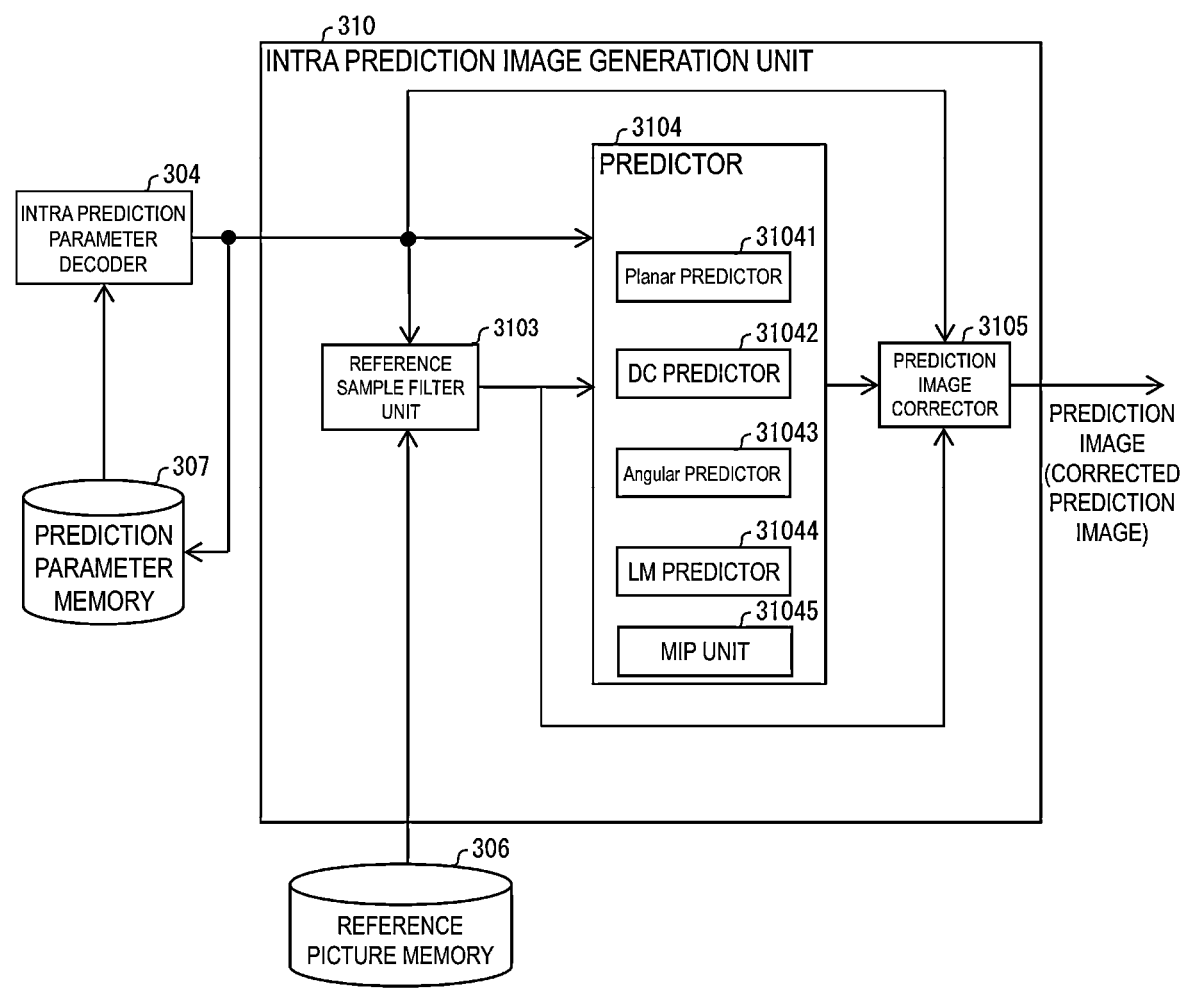
FIG. 10 is a diagram illustrating a configuration of an intra prediction image generation unit.

Now, a configuration of the intra prediction image generation unit 310 will be described in detail using FIG. 10. The intra prediction image generation unit 310 includes a reference sample filter unit 3103 (second reference image configuration unit), a predictor 3104, and a prediction image corrector 3105 (prediction image corrector, filter switching unit, weighting factor changing unit).

Based on the reference pixels (reference images) on the reference region R, a filtered reference image resulting from application of a reference pixel filter (first filter), and the intra prediction mode, the predictor 3104 generates a temporary prediction image (uncorrected prediction image) of the prediction target block, and outputs the generated image to the prediction image corrector 3105. The prediction image corrector 3105 corrects the temporary prediction image in accordance with the intra prediction mode, and generates and outputs a prediction image (corrected prediction image).

Hereinafter, the units included in the intra prediction image generation unit 310 will be described.

Reference Sample Filter Unit 3103

The reference sample filter unit 3103 references the reference image to derive a reference sample s [x] [y] at each position (x, y) on the reference region R. The reference sample filter unit 3103 applies a reference pixel filter (first filter) to the reference sample s [x] [y] in accordance with the intra prediction mode to update the reference sample s [x] [y] at each position (x, y) on the reference region R (derive the filtered reference image s [x] [y]). Specifically, a low-pass filter is applied to the reference image at a position (x, y) and surrounding reference images to derive a filtered reference image (Example 2 of the reference region in FIG. 9). Note that the low pass filter need not necessarily be applied to all the intra prediction modes but may be applied to some of the intra prediction modes. Note that the filter applied to the reference images on the reference region R in the reference sample filter unit 3103 is referred to as a "reference pixel filter (first filter)" and that a filter provided in the prediction image corrector 3105, described below, to correct the temporary prediction image is referred to as a "position-dependent filter (second filter)".

Configuration of Intra Predictor 3104

Based on the intra prediction mode, the reference image, and the filtered reference pixel value, the intra predictor 3104 generates a temporary prediction image of the prediction target block (a temporary prediction pixel value and an uncorrected prediction image) based on the reference image and outputs the generated image to the prediction image corrector 3105. The predictor 3104 internally includes a Planar predictor 31041, a DC predictor 31042, an Angular predictor 31043, an LM predictor 31044, and an MIP unit 31045. The predictor 3104 selects a specific predictor in accordance with the intra prediction mode, and inputs the reference image and the filtered reference image. The relationship between the intra prediction mode and the corresponding predictor is as follows.

Planar prediction Planar predictor 31041
DC prediction DC predictor 31042
Angular prediction Angular predictor 31043
LM prediction LM predictor 31044
Matrix intra prediction MIP unit 31045

Planar Prediction

The Planar predictor 31041 linearly adds reference samples s [x] [y] in accordance with the distance between a prediction target pixel position and a reference pixel position to generate a temporary prediction image, and outputs the temporary prediction image to the prediction image corrector 3105.

DC Prediction

The DC predictor 31042 derives a DC prediction value corresponding to the average value of the reference sampled s [x] [y], and outputs a temporary prediction image q [x] [y] having a pixel value corresponding to the DC prediction value.

Angular Prediction

The Angular predictor 31043 generates a temporary prediction image q [x] [y] by using the reference samples s [x] [y] in the prediction direction (reference direction) indicated by the intra prediction mode, and outputs the generated image to the prediction image corrector 3105.

LM Prediction

The LM predictor 31044 predicts a chrominance pixel value based on the luminance pixel value. Specifically, the scheme uses a linear model to generate a prediction image of a chrominance image (Cb, Cr) based on the decoded luminance image. An example of LM prediction is a Cross-Component Linear Model prediction (CCLM). The CCLM prediction is a prediction scheme in which a linear model for predicting chrominance from luminance is used for one block.

MIP Example 1

An example of Matrix-based intra prediction (MIP) processing performed by the MIP unit 31045 will be described with reference to FIGS. 11 to 22. MIP is a technique for deriving a prediction image by a product-sum operation performed on a reference image derived from an adjacent image and a weight matrix. In the drawings, the target block has a width nTbW and a height nTbH.

(1) Derive Boundary Reference Pixel

Figure 18:
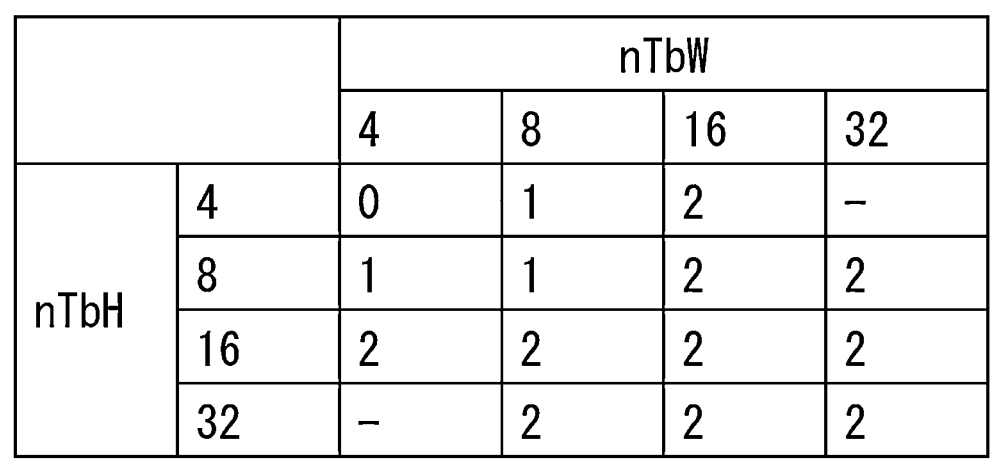

The MIP unit derives the variable sizeId related to the size of the target block by using the following equation (FIG. 18).

$$sizeId=(nTbW<=4 \,\&\&\, nTbH<=4)?0:(nTbW<=8 \,\&\&\, nTbH<=8)?1:2 \quad (MIP\text{-}1)$$

As illustrated in FIG. 18, in a case that the size of the target block (nTbW×nTbH) is 4×4, 8×8, and 16×16, sizeId is 0, 1, and 2, respectively. SizeId=2 for 4×16 and 16×4.

Next, the MIP unit 31045 uses sizeId to derive the number of MIP modes numModes, a down-sampled reference region redT [ ], the size of redL [ ] boundarySize, the width predW and height predH of an intermediate prediction image pred-Mip [ ][ ], the size predC of one side of a prediction image obtained during prediction processing with a weight matrix mWeight[predC*predC][inSize].

$$numModes=(sizeId==0)?35:(sizeId==1)?19:11$$

$$boundarySize=(sizeId==0)?2:4$$

$$predW=(sizeId<=1)?4:Min(nTbW,8)$$

$$predH=(sizeId<=1)?4:Min(nTbH,8)$$

$$predC=(sizeId<=1)?4:8 \quad (MIP\text{-}2)$$

The relationship between sizeId and the values of these variables is indicated in FIG. 17.

The weight matrix is square (predC*predC) and is 4×4 for sizeId=0 and sizeId=1 and is 8×8 for sizeId=2. In a case that the size of the weight matrix is different from the output size predW*predH of the intermediate prediction image (in particular, predC>predW or predC>predH), reference is made with the weight matrix decimated as described below. For example, in the present embodiment, in a case that the output size is 4×16 and 16×4, a weight matrix with a size (predC) of 8 indicated by sizeId=2 is selected, leading to the case of predW=4 (<predC=8) and the case of predH=4 (<predC=8), respectively. Since the size of the intermediate prediction image (predW*predH) needs to be equal to or smaller than the size of the target block nTbW*nTbH, and thus in a case that the target block has a small size, selection of a larger weight matrix (predC*predC) leads to a need for processing for making the size of the weight matrix compatible with the size of the intermediate prediction image.

The MIP unit 31045 uses IntraPredMode to derive a transpose processing flag isTransposed. IntraPredMode corresponds to, for example, intra prediction modes 0 to 66, illustrated in FIG. 6, for example.

$$isTransposed=(IntraPredMode>(numModes/2))?1:0$$

The following are derived: the number of reference pixels inSize used for a prediction based on a weight matrix mWeight [predC*predC] [inSize] and the width and height mipW and mipH of the transposed intermediate prediction image predMip [ ][ ].

inSize=2*boundarySize-((sizeId==2)?1:0)

mipW=isTransposed?predH:predW mipH=isTransposed?predW:predH

The matrix reference pixel derivation unit of the MIP unit 31045 sets, in a first reference region refT [x] (x=0 . . . nTbW−1), a pixel value predSamples [x] [−1] (x=0 . . . nTbW−1) of a block adjacently above the target block. A pixel value predSamples [−1] [y] (y=0 . . . nTbH−1) of a block adjacently leftward of the target block is set in a first reference area refL [y] (y=0 . . . nTbH−1). Next, the MIP unit 31045 down-samples a first reference region refT [x], refL [y] to derive a second reference region redT [x] (x=0 . . . boundarySize−1), redL [y] (y=0 . . . boundarySize−1). For the down-sampling, similar processing is performed on refT[ ], refL[ ], and thus the expression refS[i] (i=0 . . . nTbX−1), redS[i] (i=0 . . . boundarySize−1) is hereinafter used.

The matrix reference pixel derivation unit performs the following processing on refS[ ] into which refT [ ] or refL [ ] is substituted to derive redS[ ]. In a case that refT is substituted into refS, then nTbS=nTbW. In a case that refL is substituted into refS, then nTbS=nTbH.

```
if (boundarySize < nTbS) {
  bDwn = nTbS/boundarySize (MIP − 3)
  for (x = 0; x < boundarySize; x++)
    redS[x]= ΣrefS [x * bDwn + i] + (1 << (Log2 (bDwn) − 1))) >> Log2(bDwn)
}
else
  for (x = 0; x boundarySize; x++)
    redS [x]=refS [x]
Here, Σ is the sum of i = 0 to i = bDwn − 1.
```

Then, the matrix reference pixel derivation unit couples the second reference region redL [ ] and redT [ ] to derive p [i] (i=0 . . . 2*boundarySize−1).

```
                if (isTransposed == 1) (MIP − 4)
  for (i = 0; i < boundarySize; i++) {
    pTemp [i] = redL [i]
    pTemp [i + boundarySize] = redT [i]
  }
  else
    for (i = 0; i < boundarySize; i++) {
      pTemp [i] = redT [i]
      pTemp [i + boundarySize] = redL [i]
    }
  if (sizeId == 2)
    for (i = 0; i < inSize; i++)
      p [i] = pTemp [i + 1] − pTemp [0]
  else {
    p [0] = pTemp [0] − (1 << (BitDepthY − 1))
    for (i = 1; i < inSize; i++)
      p [i] = pTemp [i] − pTemp [0]
  }
``` bitDepthY is the bit depth of luminance and may be, for example, 10 bits.

Note that in a case that the reference pixel described above fails to be referenced, an available value of the reference pixel is used as is the case with the known intra prediction. In a case that none of the reference pixels can be referenced, 1<<(bitDepthY−1) is used as a pixel value. isTransposed represents whether the prediction direction is close to the vertical prediction or not, the patterns of mWeight [ ][ ] can be reduced by half by using isTransposed to switch between storage of redL or redT in the former half of p [ ].

(2) Derive Prediction Pixel (Matrix Operation)

Figure 11:
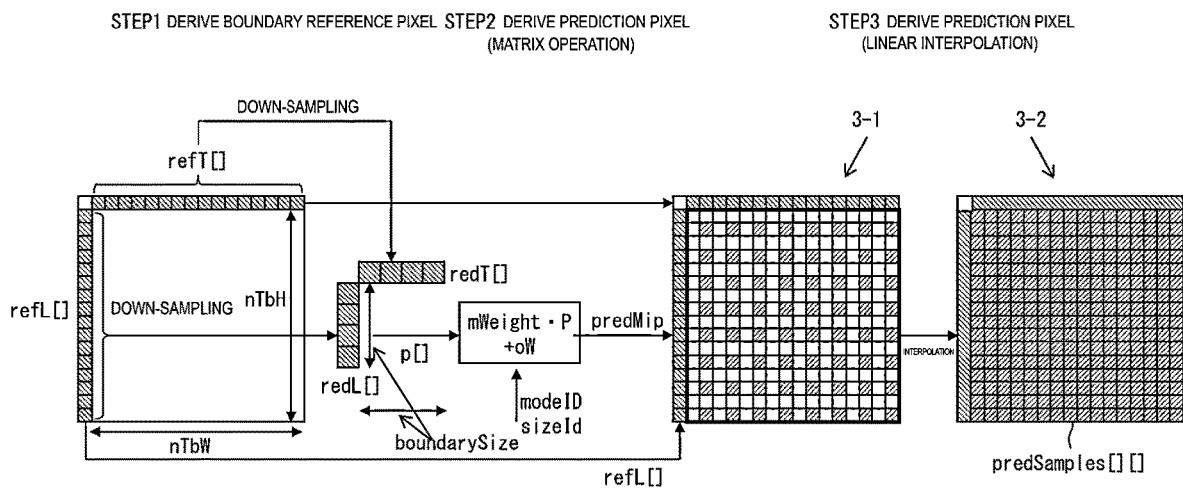
FIG. 11 is a diagram illustrating an example of MIP processing.
Figure 12:
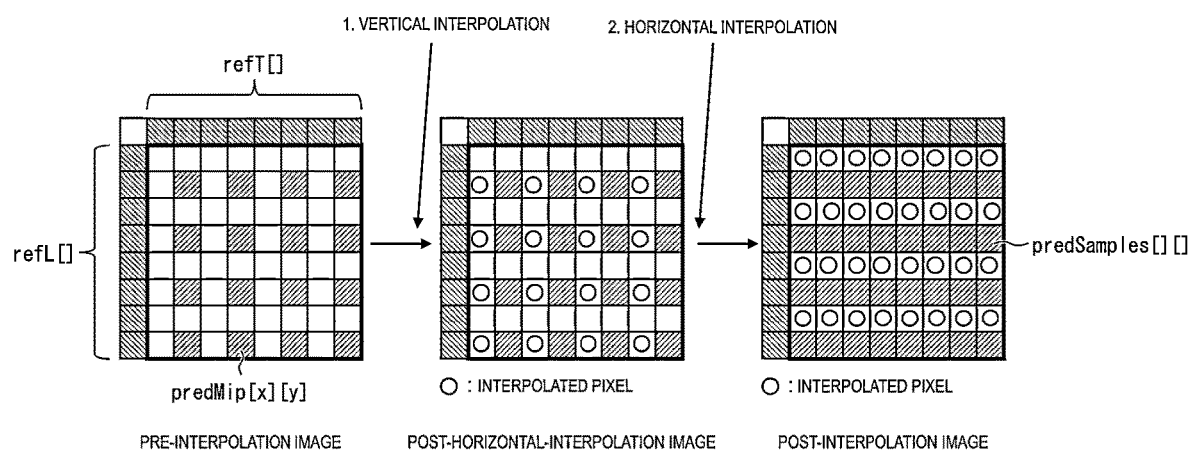
FIG. 12 is a diagram illustrating an example of MIP processing.

The MIP unit 31045 derives an intermediate prediction image predMip [ ][ ] with a size of predW*predH by matrix operation on p [ ] in STEP2 DERIVE PREDICTION PIXEL (MATRIX OPERATION) in FIG. 11.

The weight matrix derivation unit of the MIP unit 31045 references sizeId and modeId to select a weight matrix mWeight[predC*predC] [inSize] from a set of matrices.

First, the weight matrix derivation unit derives modeId using IntraPredMode. modeId is an intra prediction mode used in MIP.

modeId=IntraPredMode−((isTransposed==1)?(num-Modes/2):0)

For sizeId=0, the weight matrix derivation unit references modeId to select mWeight [16] [4] from the array WeightS0 [18] [16] [4], which stores the weight matrix. For sizeId=1, the weight matrix derivation unit references modeId to select mWeight [16] [8] from the array WeightS1 [10] [16] [8], which stores the weight matrix. For sizeId=2, the weight matrix derivation unit references modeId to select mWeight [64] [7] from the array WeightS2 [6] [64] [7], which stores the weight matrix. These are represented by the formula below.

if (sizeId==0)

mWeight[$i$][$j$]=WeightS0[modeId][$i$][$j$]($i$=0 . . . 15,$j$=0 . . . 3)

else if (sizeId==1)

mWeight[$i$][$j$]=WeightS1[modeId][$i$][$j$]($i$=0 . . . 15,$j$=0 . . . 7)

else//sizeId=2 mWeight[$i$][$j$]=WeightS2[modeId][$i$][$j$]($i$=0 . . . 63,$j$=0 . . . 6)        (MIP-5)

Then, the weight matrix derivation unit references sizeId and modeId to derive a shift value sW and an offset coefficient fO used in (MIP-7). ShiftS0 [18], ShiftS1 [10], ShiftS2 [6] are array that store shift values, and OffsetS0 [18], OffsetS1 [10], OffsetS2 [6] are array that store offset coefficients.

```
            if (sizeId == 0) { (MIP − 6)
  sW = ShiftS0 [modeId]
  fO = OffsetS0 [modeId]
}
else if (sizeId == 1) {
  sW = ShiftS1 [modeId]
  fO = OffsetS1 [modeId]
}
else { // sizeId = 2
  sW = ShiftS2 [modeId]
  fO = OffsetS2 [modeId]
}
```

The matrix prediction image derivation unit of the MIP unit 31045 performs a product-sum operation of (MIP-7) on p [ ] to derive predMip [ ][ ] of the size of the mipW*mipH. Here, an element of the weight matrix mWeight [ ][ ] is referenced for each corresponding position of predMip [ ] to derive the intermediate prediction image. Note that in the present example, for sizeId=2, the size predC of the weight matrix may be larger than the size mipW or mipH of predMip. For this reason, the weight matrix is subjected to decimation by using variables incW and incH before referencing.

```
oW = (1 << (sW − 1)) − fO * Σp [i]
incW = (predC > mipW) ? 2 :1
incH = (predC > mipH) ? 2 :1
for (x = 0; x < mipW; x++)   (MIP − 7)
  for (y = 0; y < mipH; y++) {
    predMip [x] [y] = (((ΣmWeight [i] [y * incH * predC +x*
incW] * p [i]) + oW) >> sW) + pTemp [0]
    predMip [x] [y] = Clip1Y (predMip [x] [y]) }
Σ is the sum of i = 0 to i = inSize − 1.
```

In a case that isTransposed=1, the input p [ ] to the product-sum operation is stored with the position of the upper reference pixel replaced with the position of the left reference pixel, and the output of the product-sum operation predMip [ ][ ] is transposed before being output to (3).

```
if (isTransposed == 1) {   (MIP − 8)
  for (x = 0; x < predW; x++)
    for (y = 0; y < predH; y++)
      tmpPred [x] [y] = predMip [y] [x]
  for (x = 0; x < predW; x++)
    for (y = 0; y < predH; y++)
      predMip [x] [y] = tmpPred [x] [y]
}
```

(3) Derive Prediction Pixel (Linear Interpolation)

In a case that nTbW=predW and nTbH=predH, the matrix prediction image interpolation unit of the MIP unit 31045 copies predMip [ ][ ] to predsamples [ ].

for (*x*=0;*x*<nTbW;*x*++)

for (*y*=0;*y*<nTbH;*y*++)

predSamples[*x*][*y*]=predMip[*x*][*y*]

Otherwise (nTbW>predW or nTbH>predH), the matrix prediction image interpolation unit stores predMip [ ] in a prediction image predSamples [ ][ ] with a size nTbW*nTbH in 3-1 of STEP3 DERIVE PREDICTION PIXEL (LINEAR INTERPOLATION) in FIG. 11. In a case that predW and predH are different from nTbW and nTbH, the prediction pixel values are interpolated in 3-2.

(3-1) The matrix prediction image interpolation unit stores predMip [ ][ ] in predSamples [ ][ ]. In other words, in a pre-interpolation image in FIG. 12, predMip [ ][ ] is stored in hatched pixel positions in the upper right and lower left direction.

upHor=nTbW/predW upVer=nTbH/predH for (*x*=0;*x*<predW;*x*++)

for (*y*=0;*y*<predH;*y*++)

predSamples[(*x*+1)*upHor−1][(*y*+1)*upVer−1]=pred-
Mip[*x*][*y*]   (MIP-9)

(3-2) For nTbH>nTbW, pixels that have not been stored in (3-1) are interpolated first in the horizontal direction and then in the vertical direction by using pixel values for adjacent blocks to generate a prediction image.

Horizontal interpolation is performed to derive pixel values at positions indicated by circles by using predSamples [xHor] [yHor] and predSamples [xHor+upHor] [yHor] (hatched pixels in the horizontally interpolated image in the figure).

```
for (m = 0; m < predW; m++)   (MIP − 10)
  for (n = 1; n <= predH; n++)
    for (dX = 1; dX < upHor; dX++) {
      xHor = m * upHor − 1
      yHor = n * upVer − 1
      sum = (upHor − dX) * predSamples [xHor] [yHor] + dX *
predSamples [xHor + upHor] [yHor]
      predSamples [xHor + dX] [yHor] = (sum + upHor/2)/upHor
    }
```

After the horizontal interpolation, pixel values at positions indicated by circles are derived by using predSamples [xVer] [yVer] and predSamples [xVer] [yVer+upVer] (hatched pixels in the vertically interpolated image in the figure).

```
for (m = 0; m < nTbW; m++)   (MIP − 11)
  for (n = 0; n < predH; n++)
    for (dY = 1; dY < upVer; dY++) {
      xVer = m
      yVer = n * upVer − 1
      sum = (upVer − dY) * predSamples [xVer] [yVer] + dY *
predSamples [xVer] [yVer + upVer]
      predSamples [xVer] [yVer + dY] = (sum + upVer/2)/upVer
    }
```

For nTbH<=nTbW, interpolation is performed first in the vertical direction and then in the horizontal direction by using the pixel values for the adjacent blocks to generate a prediction image. The vertical and horizontal interpolation processing is similar to that in the case of nTbH>nTbW.

MIP Example 2

In the present example, an example will be described that simplifies, compared to MIP Example 1, processing without a decrease in coding efficiency. The description below focuses on changes, and thus portions that are not described below correspond to the same processing as that in MIP Example 1.

Figure 16:
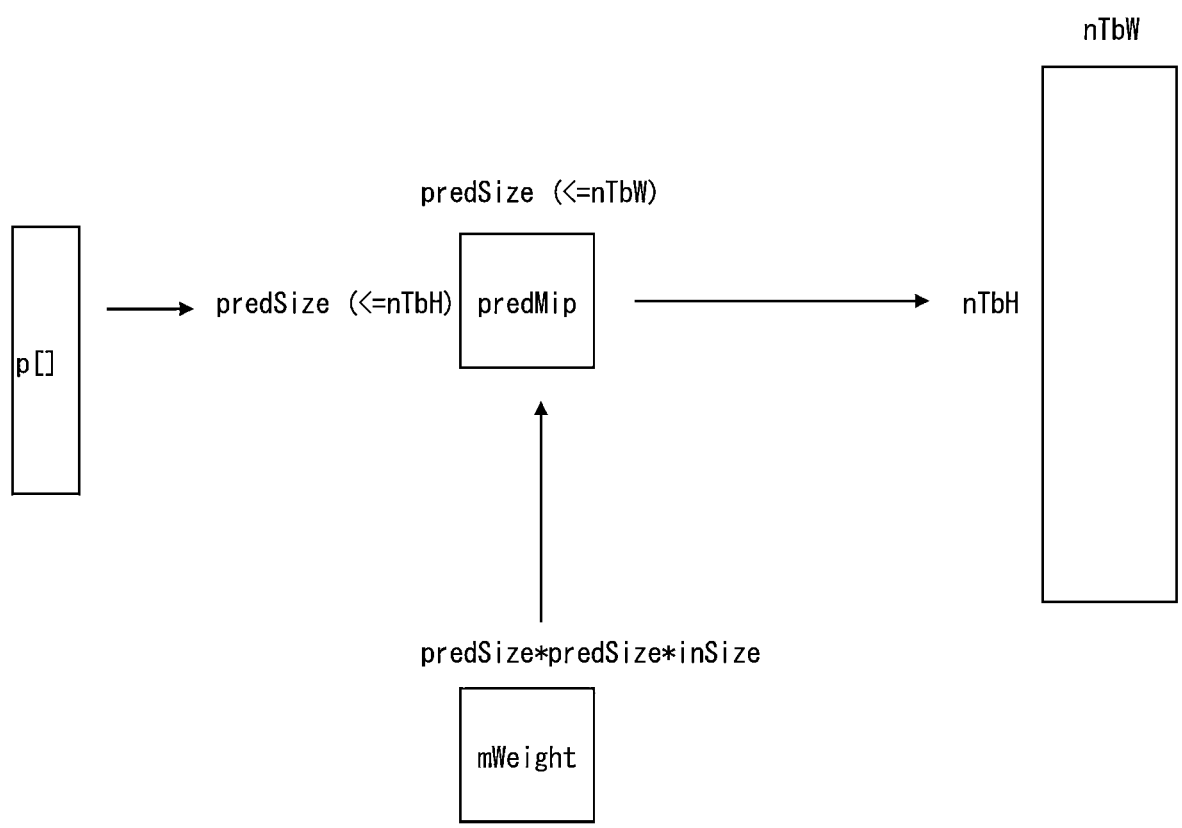
FIG. 16 is a diagram illustrating MIP processing according to the present embodiment.

FIG. 16 illustrates a configuration of the MIP unit 31045 that references a square matrix mWeight to derive a square intermediate prediction image predMip with the same size. A width and a height of mWeight is smaller than or equal to the width nTbW and the height bTbH of the target block, respectively.

In the present example, for sizeId=2, predW=predH=predC is set. Accordingly, the definition of sizeId is changed. Hereinafter, predW, predH, and predC are described as predSize.

(1) Derive Boundary Reference Pixel

Figure 20:
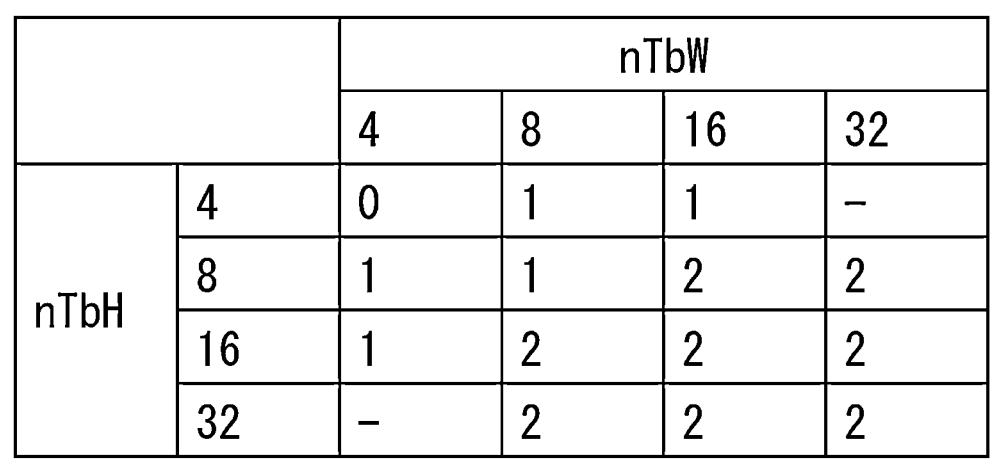

The MIP unit derives the variable sizeId related to the size of the target block by using the following equation (FIG. 20).

sizeId=(nTbW<=4 && nTbH<=4 && nTbH<=4)?0:
(nTbW<=4||*TbH*<=4||nTbW<=8 &&
nTbH==8))?1:2   (MIP-21)

For example, if the size of the target block is 4×N, N×4 (N>4), and 8×8, sizeId is 1. With the same classification, the expression (MIP-21) may use a different form. For example, the following expression can be used.

sizeId=(nTbW<=4 && nTbH<=4)?0:((nTbW<=8 && nTbH<=8)|nTbW<=4|nTbH<=4)?1:2    (MIP-21)

Another example may be the following.

sizeId=(nTbW<=4 && nTbH<=4)?0:((nTbW==8 && nTbH==8)|nTbW<=4|nTbH<=4)?1:2    (MIP-21)

In a case that the minimum size of the input block is 4×4, nTbW<=4 and nTbH<=4 may be replaced with nTbW==4 and nTbH==4, respectively.

Furthermore, in a case that the block size to which the MIP is applied is limited, the MIP unit may derive sizeId by another derivation method. For example, as illustrated in FIG. 20, in a case that the MIP is applied only to blocks with an input block size aspect ratio of 4 or less (Abs (Log 2 (nTbW)−Log 2 (nTbH))<=2), sizeId may be derived as follows instead of (MIP-21).

sizeId=(nTbW<=4 && nTbH<=4)?0:
(nTbW*nTbH<=64)?1:2    (MIP-21a)

Alternatively, a logarithmic representation may be used to perform derivation as follows.

sizeId=(nTbW<=4 && nTbH<=4)?0:(Log 2(nTbW)+
Log 2(nTbH)<=6)?1:2    (MIP-21b)

In a case that the block size to which the MIP is applied is limited, an effect that simplifies processing is produced because sizeId is derived using (MIP-21a) and (MIP-21b).

As illustrated in FIG. 20, in the present embodiment, in the case of 4×16 and 16×4, a matrix indicated by sizeId=1 and having a size (predC) of 4 is selected, preventing predW and predH from becoming smaller than the size of the matrix predC(=predSize). The MIP unit 31045 of the present embodiment selects a matrix having a size equal to or smaller than nTbW and bTbH (predC=predSize), that is, a matrix satisfying the following equation.

predSize=predC<=min(nTbW,nTbH)

In the present embodiment, the size of the matrix is 4×4 in the case of sizeId=0, and is 8×8 in the case of sizeId=2. Thus, the MIP unit 31045 selects "a matrix with sizeId=0 or sizeId=1 in a case that one of nTbW and bTbH is 4". Such limitation to the selection is the same in FIG. 21 and FIG. 22 described below.

In other words, the weight matrix derivation unit included in the MIP unit 31045 derives a matrix with a size including a width and a height equal to or smaller than the width and height of the target block size. The weight matrix derivation unit derives a matrix with a size of 4×4 in a case that one side of the target block is 4. The weight matrix derivation unit derives a matrix with a size of 4×4 in a case that the target block size is 4×16 and in a case that the target block size is 16×4. The weight matrix derivation unit derives one of a matrix indicated by sizeId=0, 1 and having a size of 4×4 and a matrix indicated by sizeId=2 and having a size of 8×8, and derives a matrix with sizeId=1 or 2 in a case that one side of the target block is 4.

Then, the MIP unit 31045 uses sizeId to derive the number of MIP modes numModes, the down-sampled reference region redT [ ], the size of redL [ ] boundarySize, the weight matrix mWeight, and the width and height predSize of the intermediate prediction image predMip [ ][ ].

numModes=(sizeId==0)?35:(sizeId==1)?19:11 boundarySize=(sizeId==0)?2:4 predSize=(sizeId<=1)?4:8    (MIP-22)

FIG. 19 illustrates the relationship between sizeId and the values of these variables.

The derivation of isTransposed and inSize is similar to the derivation of isTransposed and inSize in MIP Example 1.

Derivation of p [ ] and pTemp [ ] is also similar to the derivation of p [ ] and pTemp [ ] in MIP Example 1; the derivation of p [ ] and pTemp [ ] is required for the derivation of the first reference region refT [ ], refL [ ], the second reference area redT [ ], redL [ ], and predMip.

(2) Derive Prediction Pixel (Matrix Operation)

The MIP unit 31045 derives predMip [ ][ ] with the size predSize*predSize by a matrix operation performed on p [ ] in the STEP2 DERIVE PREDICTION PIXEL (MATRIX OPERATION) in FIG. 11.

The weight matrix derivation unit of the MIP unit 31045 references sizeId and modeId to select a weight matrix mWeight [predSize*predSize] [inSize] from a set of matrices.

The selection method for modeId and mWeight [ ][ ] and the derivation method for the shift value sW and the offset coefficient fO are the same as those in MIP Example 1.

The matrix prediction image derivation unit of the MIP unit 31045 derives predMip [ ][ ] with the size predSize*predSize by a product-sum operation of (MIP-23) on p [ ]. Here, in the classification of sizeId in the present example, mipW and mipH are always equal to or larger than predSize (predC). Accordingly, incW and incH in Example 1 are always 1, and the calculations are omitted.

```
oW= (1 << (sW − 1)) − fO * Σp [i]
for (x = 0; x < predSize; x++)   (MIP − 23)
  for (y = 0; y < predSize; y++) {
    predMip [x] [y] = (((ΣmWeight [i] [y * predSize + x] * p
[i]) + oW) >> sW) + pTemp [0]
    predMip [x] [y] = Clip1Y (predMip [x] [y])
  }
Σ is the sum of i = 0 to i = inSize − 1.
    if (isTransposed = = 1) {   (MIP − 24)
  for (x = 0; x < predSize; x++)
    for (y = 0; y < predSize; y++)
      tmpPred [x] [y] = predMip [y] [x]
  for (x = 0; x < predSize; x++)
    for (y = 0; y < predSize; y++)
      predMip [x] [y] = tmpPred [x] [y]
}
```

(3) Derive Prediction Pixel (Linear Interpolation)

In a case that nTbW=predSize and nTbH=predSize, the matrix prediction image interpolation unit of the MIP unit 31045 copies predMip [ ][ ] to predsamples [ ][ ].

for (x=0;x<nTbW;x++)

for (y=0;y<nTbH;y++)

predSamples[x][y]=predMip[x][y]

Otherwise (nTbW>predSize or nTbH>predSize), the matrix prediction image interpolation unit enlarges predMip [ ] with predSize*predSize to the predicted image predSamples [ ] with a size of nTbW*nTbH in STEPS DERIVE PREDICTION PIXEL (LINEAR INTERPOLATION) in FIG. 11. In 3-1, the pixels at the corresponding positions are copied, whereas in 3-2, the pixels at non-corresponding positions are derived by interpolation.

(3-1) The matrix prediction image interpolation unit stores predMip [ ][ ] in corresponding positions in predSamples [ ]. In other words, in the pre-interpolation image in FIG. 12, predMip [ ][ ] is stored in hatched pixel positions in predSamples [ ] in 3-1.

upHor=nTbW/predSize upVer=nTbH/predSize for (x=0;x<predSize;x++)

for (y=0;y<predSize;y++)

predSamples[(x+1)*upHor−1][(y+1)upVer−1]=pred-
   Mip[x][y]                                          (MIP-25)

(3-2) For nTbH>nTbW, pixels that have not been stored in (3-1) are interpolated in the horizontal direction and in the vertical direction by using pixel values for adjacent blocks to generate a prediction image. In the following, interpolation is performed first in the horizontal direction and then in the vertical direction, but may be interpolated first in the vertical direction and then in the horizontal direction.

Horizontal interpolation is performed to derive pixel values at positions indicated by circles by using pred-Samples [xHor] [yHor] and predSamples [xHor+upHor] [yHor] (hatched pixels in the horizontally interpolated image in the figure).

```
for (m = 0; m < predSize; m++)   (MIP − 26)
  for (n = 1; n <= predSize; n++)
    for (dX = 1; dX < upHor; dX++) {
      xHor = m * upHor − 1
      yHor = n * upVer − 1
      sum = (upHor − dX) * predSamples [xHor] [yHor] + dX * predSamples [xHor + upHor] [yHor]
      predSamples [xHor + dX] [yHor] = (sum + upHor/2)/upHor
    }
```

After the horizontal interpolation, pixel values at positions indicated by circles are derived by using predSamples [xVer] [yVer] and predSamples [xVer] [yVer+upVer] (hatched pixels in the vertically interpolated image in the figure).

```
for (m = 0; m < nTbW; m++)   (MIP − 27)
  for (n = 0; n < predSize; n++)
    for (dY = 1; dY < upVer; dY++) {
      xVer = m
      yVer = n * upVer − 1
      sum = (upVer − dY) * predSamples [xVer] [yVer] + dY * predSamples [xVer] [yVer + upVer]
      predSamples [xVer] [yVer + dY] = (sum + upVer/2)/upVer}
```

For nTbH<=nTbW, interpolation is performed first in the vertical direction and then in the horizontal direction by using the pixel values for the adjacent blocks to generate a prediction image. The vertical and horizontal interpolation processing is similar to that in the case of nTbH>nTbW.

The MIP unit 31045 in MIP Example 2 derives a square (predW=predH=predSize) intermediate prediction image predMip [ ][ ]. Address calculation for the prediction image is facilitated, simplifying the derivation processing.

The MIP unit 31045 in MIP Example 2 selects predSize equal to or smaller than the width nTbW and height nTbH of the target block, and thus the matrix size predC(=predSize) selected by sizeId is equal to predW and predH, facilitating referencing of the matrix elements in the derivation of predMip.

By limiting the width and height of the prediction image classified into sizeId=2, MIP Example 2 can significantly reduce the number of calculations compared to MIP Example 1. Simulations have confirmed that there is substantially no decrease in coding efficiency due to these changes.

MIP Example 3

In the present example, another example will be described that simplifies, compared to MIP Example 1, processing without a decrease in coding efficiency. The description below focuses on changes, and thus portions that are not described below correspond to the same processing as that in MIP Example 2.

In the present example, for sizeId=2, predW=predH=predC is set. Accordingly, the definition of sizeId is changed. Hereinafter, predW, predH, and predC are described as predSize.

(1) Derive Boundary Reference Pixel

The MIP unit derives the variable sizeId related to the size of the target block by using the following equation (upper portion of FIG. 21).

$$\text{sizeId}=(nTbW<=4\ \&\&\ nTbH<=4)?0:\\(nTbW<=4||nTbH<=4)?1:2 \quad (\text{MIP-28})$$

Alternatively, sizeId may be determined under another condition (lower portion of FIG. 21).

$$\text{sizeId}=(nTbW<=4\ \&\&\ nTbH<=4)?0:\\(nTbW<=8||nTbH<=8)?1:2 \quad (\text{MIP-29})$$

(2) Derive Prediction Pixel (Matrix Operation)

The derivation is similar to the corresponding derivation in MIP Example 2.

(3) Derive Prediction Pixel (Linear Interpolation)

The derivation is similar to the corresponding derivation in MIP Example 2.

As described above, MIP Example 3 further simplifies the determination of sizeId to enable a further reduction in the number of calculations, compared to MIP Example 2.

Note that, like MIP Example 2, the MIP Example 3 derives a square (predW=predH=predSize) intermediate prediction image predMip [ ][ ] and selects predSize equal to or smaller than the width nTbW and height nTbH of the target block to limit the width and height of the prediction image classified into sizeId=2. Thus, MIP Example 3 produces the same effects as those in MIP Example 2.

MIP Example 4

In the present example, another example will be described in which the memory required to store the weight matrix is reduced, compared to MIP Example 1. The description below focuses on changes, and thus portions that are not described below correspond to the same processing as that in MIP Example 2.

In the present example, for sizeId=2, predW=predH=predC is set. Accordingly, the definition of sizeId is changed. Hereinafter, predW, predH, and predC are described as predSize.

(1) Derive Boundary Reference Pixel

The MIP unit derives the variable sizeId related to the size of the target block by using the following equation.

$$\text{sizeId}=(nTbW<=4||nTbH<=4)?0:1 \quad (\text{MIP-30})$$

The value of sizeId has been described as 0, 1 in the above example. However, in a case that $$\text{sizeId}=(nTbW<=4||nTbH<=4)?0:2 \quad (\text{MIP-34})$$

as in the upper portion of FIG. 22, or $$\text{sizeId}=(nTbW<=4||nTbH<=4)?1:2 \quad (\text{MIP-34})$$

as in the lower portion of FIG. 22, sizeId can be represented as a combination of 0, 2 or 1, 2. Note that, instead of the conditional expression (nTbW<=4||nTbH<=4), (nTbW<=8||nTbH<=8) may be used.

In the example of the expression MIP-30, sizeId may have two values of 0,1. Thus, all of the processing in the case of sizeId=2 in MIP Example 2 can be omitted. For example, only the following equation can be used to derive p [i] (i=0 . . . 2* boundarySize−1) from the second reference area redL [ ], redT [ ].

```
            if (isTransposed == 1)  (MIP − 31)
              for (i = 0; i < boundarySize; i++) {
                pTemp [i] = redL [i]
                pTemp [i + boundarySize] = redT [i]
              }
            else
              for (i = 0; i < boundarySize; i++) {
                pTemp [i] = redT [i]
                pTemp [i + boundarySize] = redL [i]
              }
```

(2) Derive Prediction Pixel (Matrix Operation)

The derivation may be performed as is the case with MIP Example 2. However, the present example does not use sizeId=2, and thus processing for referencing sizeId and modeId to select the weight matrix mWeight [predSize*predSize] [inSize] from the set of matrices may be represented by the following equation, with sizeId=2 omitted.

if (sizeId==0)

mWeight[$i$][$j$]=WeightS0[modeId][$i$][$j$]($i$=0 . . . 15,$j$=0 . . . 3)

else//sizeId==1 mWeight[$i$][$j$]=WeightS1[modeId][$i$][$j$]($i$=0 . . . 15,$j$=0 . . . 7)    (MIP-32)

Similarly, the processing for referencing sizeId and modeId to derive the shift value sW and the offset coefficient fO may be represented by the following equation:

```
            if (sizeId == 0) {   (MIP − 33)
              sW = ShiftS0 [modeId]
              fO = OffsetS0 [modeId]
            }
            else {// sizeId == 1)
              sW = ShiftS1 [modeId]
              fO = OffsetS1 [modeId]
            }
```

(3) Derive Prediction Pixel (Linear Interpolation)

The derivation is similar to the corresponding derivation in MIP Example 2.

As described above, MIP Example 3 reduces the types of sizeId compared to MIP Example 2, thus enabling a reduction in memory required to store the weight matrix compared to MIP Example 2.

Note that, like MIP Example 2, MIP Example 3 derives a square (predW=predH=predSize) intermediate prediction image predMip [ ][ ] and selects a matrix with a size (predSize) equal to or smaller than the size of the target block nTbW×nTbH to limit the width and height of the prediction image classified into sizeId=2. Thus, MIP Example 3 produces the same effects as those in MIP Example 2.

Configuration of Prediction Image Corrector 3105

The prediction image corrector 3105 corrects the temporary prediction image output from the predictor 3104 in accordance with the intra prediction mode. Specifically, the prediction image corrector 3105 derives, for each pixel of the temporary prediction image, a weight coefficient dependent on the position according to the positions of the reference region R and the target prediction pixel. Then, the reference samples s [ ][ ] and the temporary*prediction image are subjected to weighted addition (weighted average) to correct the temporary prediction image to a prediction image (corrected prediction image) Pred [ ][ ]. Note that in some intra prediction modes, the prediction image corrector 3105 does not correct the temporary prediction image and that the output of the predictor 3104 may be directly used as a prediction image.

The inverse quantization and inverse transform processing unit 311 performs inverse quantization on a quantization transform coefficient input from the entropy decoder 301 to calculate a transform coefficient. These quantization transform coefficients are coefficients obtained by performing, in coding processing, a frequency transform such as a Discrete Cosine Transform (DCT) or a Discrete Sine Transform (DST) on the prediction error to perform quantization. The inverse quantization and inverse transform processing unit 311 performs an inverse frequency transform such as an inverse DCT or an inverse DST on the calculated transform coefficient to calculate the prediction error. The inverse quantization and inverse transform processing unit 311 outputs the calculated prediction error to the addition unit 312.

The addition unit 312 adds the prediction image P of the block input from the prediction image generation unit 308 to the prediction error input from the inverse quantization and inverse transform processing unit 311 for each pixel and generates a decoded image for the block. The addition unit 312 stores the decoded image of the block in the reference picture memory 306 and outputs the image to the loop filter 305.

Configuration of Video Coding Apparatus

Figure 13:
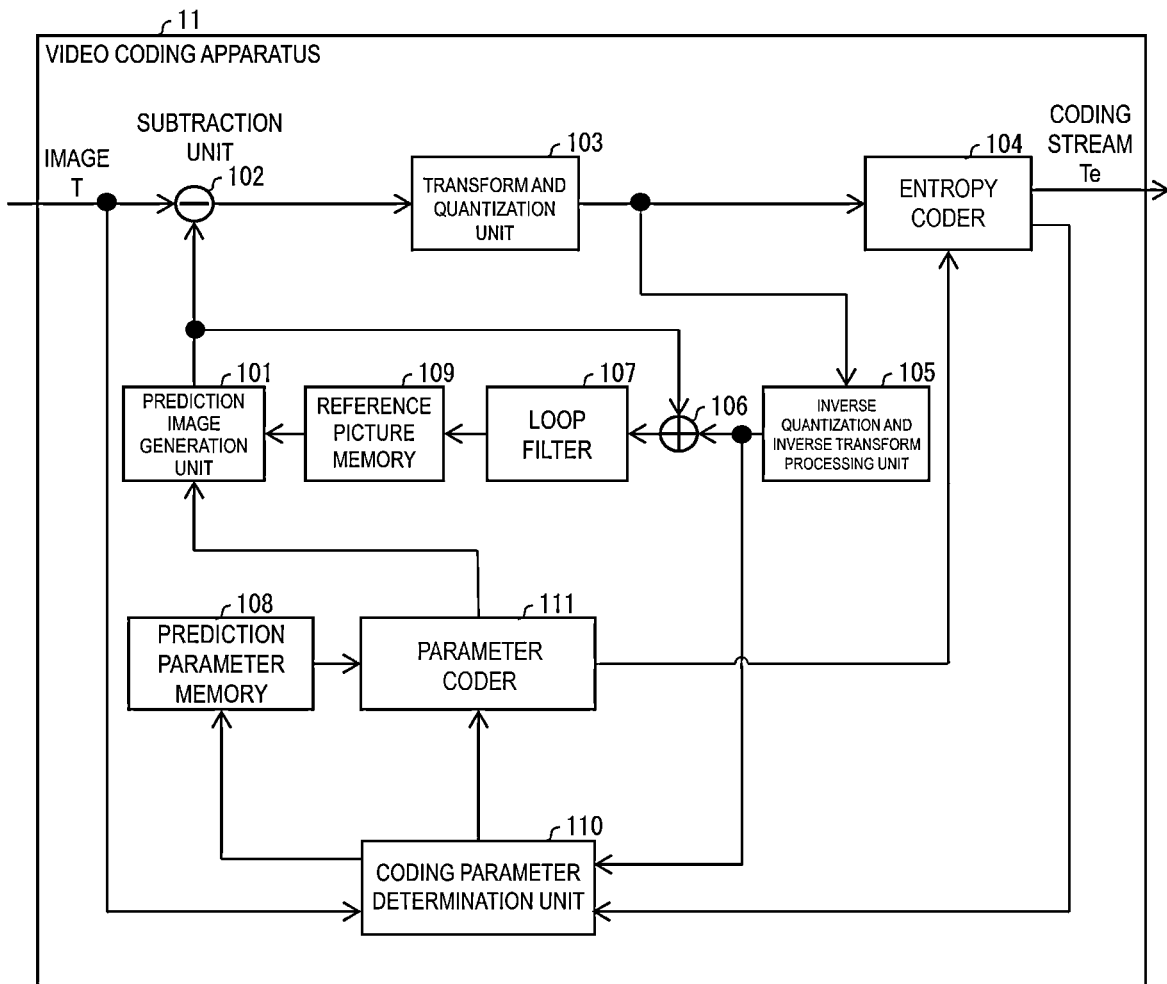
FIG. 13 is a block diagram illustrating a configuration of the video coding apparatus.

Now, a configuration of the video coding apparatus 11 according to the present embodiment will be described. FIG. 13 is a block diagram illustrating a configuration of the video coding apparatus 11 according to the present embodiment. The video coding apparatus 11 is configured to include a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a prediction parameter coder 111, and an entropy coder 104.

For each picture of an image T, the prediction image generation unit 101 generates a prediction image P for each of the CUs into which each picture of the image T is split. The operation of the prediction image generation unit 101 is the same as that of the prediction image generation unit 308 already described.

The subtraction unit 102 subtracts the pixel value of the prediction image of the block input from the prediction image generation unit 101 from the pixel value of the image T to generate a prediction error. The subtraction unit 102 outputs the generated prediction error to the transform and quantization unit 103.

The transform and quantization unit 103 performs a frequency transform on the prediction error input from the subtraction unit 102 to calculate a transform coefficient, and derives a quantization transform coefficient through quantization. The transform and quantization unit 103 outputs the obtained quantization transform coefficient to the entropy coder 104 and the inverse quantization and inverse transform processing unit 105.

The inverse quantization and inverse transform processing unit 105 is the same as the inverse quantization and inverse transform processing unit 311 (FIG. 7) in the video decoding apparatus 31, and descriptions thereof are omitted. The calculated prediction error is output to the addition unit 106.

To the entropy coder 104, the quantization transform coefficient is input from the transform and quantization unit 103, and coding parameters are input from the prediction parameter coder 111. The entropy coder 104 entropy-codes the split information, the prediction parameters, the quantization conversion coefficients, and the like to generate and output a coding stream Te.

The parameter coder 111 includes a header coder 1110, a CT information coder 1111, and a CU coder 1112 (prediction mode coder) not illustrated, an inter prediction parameter coder 112, and an intra prediction parameter coder 113. The CU coder 1112 further includes a TU coder 1114.

Configuration of Intra Prediction Parameter Coder 113

The intra prediction parameter coder 113 derives a format for coding (for example, intra_luma_mpm_idx, intra_luma_mpm_remmainder, and the like) from the intra prediction mode IntraPredMode input from the coding parameter determination unit 110. The intra prediction parameter coder 113 includes a partly identical configuration to a configuration in which the intra prediction parameter decoder 304 derives intra prediction parameters.

Figure 14:
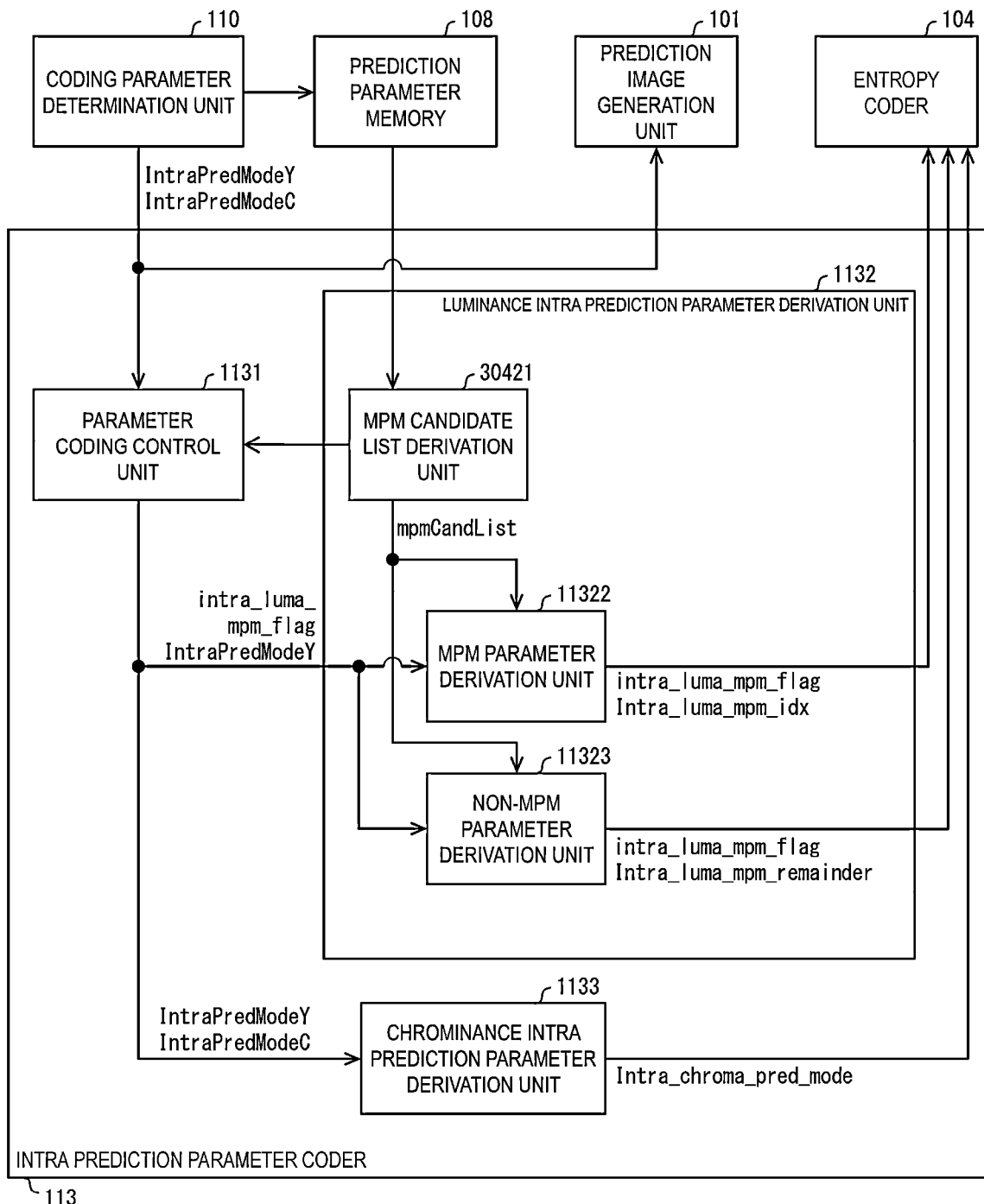
FIG. 14 is a schematic diagram illustrating a configuration of an intra prediction parameter coder.
Figure 15:
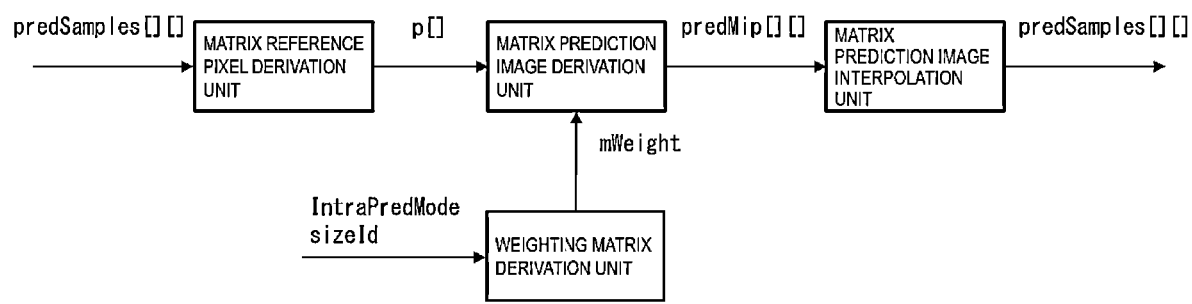
FIG. 15 is a diagram illustrating details of an MIP unit.

FIG. 14 is a schematic diagram illustrating a configuration of the intra prediction parameter coder 113 of the parameter coder 111. The intra prediction parameter coder 113 includes a parameter coding control unit 1131, a luminance intra prediction parameter derivation unit 1132, and a chrominance intra prediction parameter derivation unit 1133.

The parameter coding control unit 1131 receives input of IntraPredModeY and IntraPredModeC from the coding parameter determination unit 110. The parameter coding control unit 1131 references the mpmCandList [ ] of the MPM candidate list derivation unit 30421 to determine the intra_luma_mpm_flag. Then, the intra_luma_mpm_flag and IntraPredModeY are output to the luminance intra prediction parameter derivation unit 1132. The IntraPredModeC is output to the chrominance intra prediction parameter derivation unit 1133.

The luminance intra prediction parameter derivation unit 1132 includes the MPM candidate list derivation unit 30421 (a candidate list derivation unit), an MPM parameter derivation unit 11322, and a non-MPM parameter derivation unit 11323 (an coder, a derivation unit).

The MPM candidate list derivation unit 30421 references the intra prediction mode of the adjacent blocks stored in the prediction parameter memory 108 to derive mpmCandList [ ]. The MPM parameter derivation unit 11322 derives and outputs intra_luma_mpm_idx from the IntraPredModeY and mpmCandList [ ] to the entropy coder 104 in a case that the intra_luma_mpm_flag is 1. The non-MPM parameter derivation unit 11323 derives RemIntraPredMode from IntraPredModeY and mpmCandList [ ] and outputs intra_luma_mpm_remainder to the entropy coder 104 in a case that intra_luma_mpm_flag is 0.

The chrominance intra prediction parameter derivation unit 1133 derives and outputs intra_chroma_pred_mode from IntraPredModeY and IntraPredModeC.

The addition unit 106 adds the pixel value of the prediction image of the block input from the prediction image generation unit 101 to the pixel value of the prediction error input from the inverse quantization and inverse transform processing unit 105 for each pixel and generates a decoded image. The addition unit 106 stores the generated decoded image in the reference picture memory 109.

The loop filter 107 applies a deblocking filter, SAO, and ALF to the decoded image generated by the addition unit 106. Note that the loop filter 107 need not necessarily include the above-described three types of filters, and may include, for example, only the deblocking filter.

The prediction parameter memory 108 stores the prediction parameters generated by the coding parameter determination unit 110 in positions predetermined for each picture and for each CU.

The reference picture memory 109 stores the decoded image generated by the loop filter 107 in positions predetermined for each picture and for each CU.

The coding parameter determination unit 110 selects one set among multiple sets of coding parameters. A coding parameter refers to the above-mentioned QT, BT, or TT split information, the prediction parameter, or a parameter to be coded, the parameter being generated in association with the information or prediction parameter. The prediction image generation unit 101 generates the prediction image using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. With this configuration, the entropy coder 104 outputs the selected set of coding parameters as the coding stream Te. The coding parameter determination unit 110 stores the determined coding parameters in the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the prediction parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

A part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present disclosure has been described in detail above referring to the drawings, but the specific configuration is not limited to the above embodiments and various amendments can be made to a design that fall within the scope that does not depart from the gist of the present disclosure.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
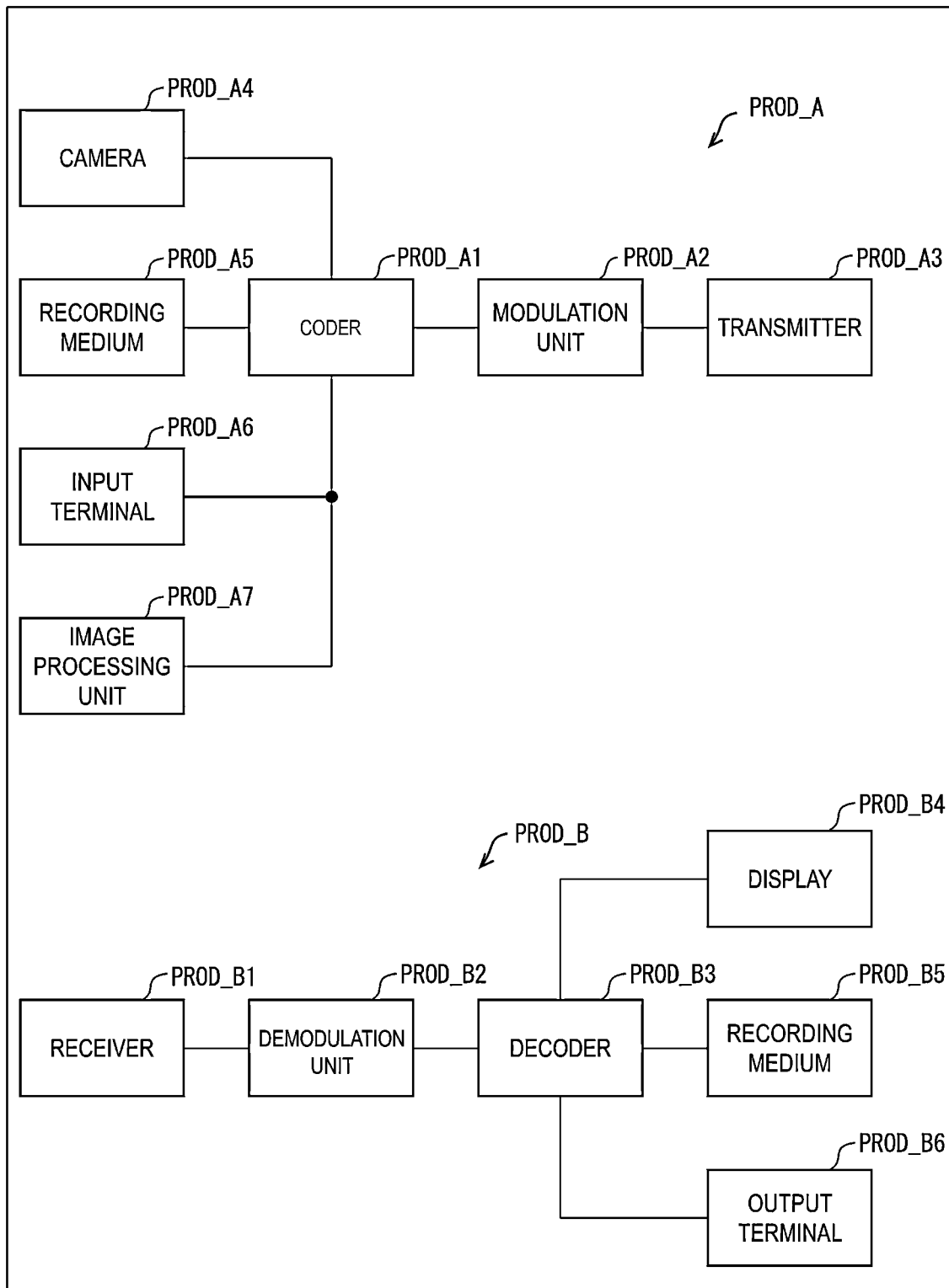
FIG. 2 is a diagram illustrating configurations of a transmitting apparatus equipped with a video coding apparatus and a receiving apparatus equipped with a video decoding apparatus according to the present embodiment. PROD_A denotes the transmitting apparatus equipped with the video coding apparatus, and PROD_B denotes the receiving apparatus equipped with the video decoding apparatus.

FIG. 2 is a block diagram illustrating a configuration of a transmitting apparatus PROD_A installed with the video coding apparatus 11. As illustrated in FIG. 2, the transmitting apparatus PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in FIG. 2, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2 illustrates a block diagram illustrating a configuration of a receiving apparatus PROD_B installed with the video decoding apparatus 31. As illustrated in FIG. 2, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 2, some of the constituents may be omitted.

Note that the recording medium PROD_B5 may record videos which are not coded, or may record videos which are coded in a coding scheme for recording different from a coding scheme for transmission.

In the latter case, an coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. A transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. A broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

A server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
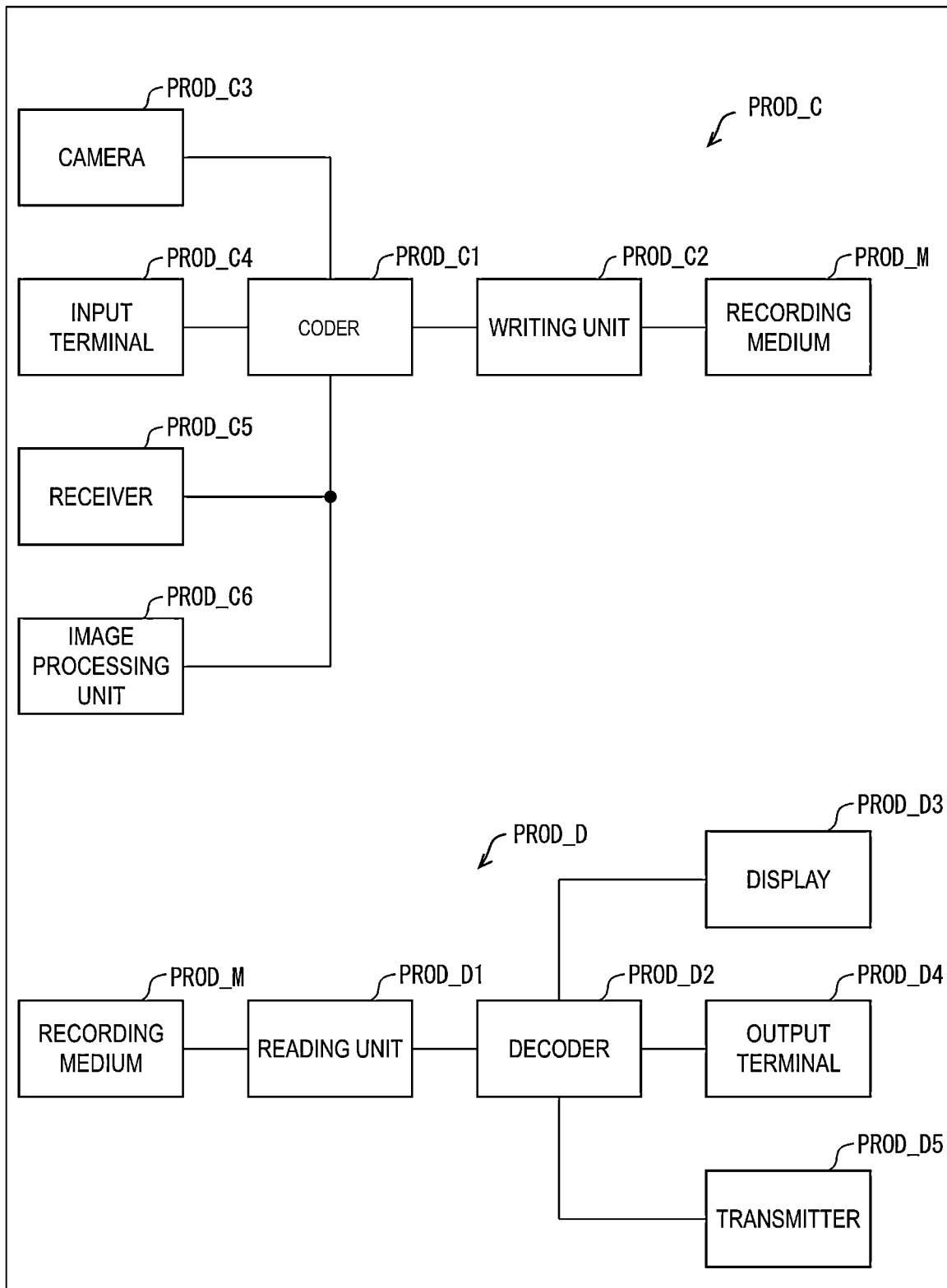
FIG. 3 is a diagram illustrating configurations of a recording apparatus equipped with the video coding apparatus and a reconstruction apparatus equipped with the video decoding apparatus according to the present embodiment. PROD_C denotes the recording apparatus equipped with the video coding apparatus, and PROD_D denotes the reconstruction apparatus equipped with the video decoding apparatus.

FIG. 3 is a block diagram illustrating a configuration of a recording apparatus PROD_C installed with the above-mentioned video coding apparatus 11. As illustrated in FIG. 3, the recording apparatus PROD_C includes an coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

The recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in FIG. 3, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). A camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3 is a block diagram illustrating a configuration of a reconstruction apparatus PROD_D installed with the above-mentioned video decoding apparatus 31. As illustrated in FIG. 3, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

The reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 3, some of the constituents may be omitted.

Note that the transmitter PROD_D5 may transmit a video which is not coded or may transmit coded data coded in the coding scheme for transmission different from a coding scheme for recording. In the latter case, an coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). A television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc(DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

INDUSTRIAL APPLICABILITY

The embodiments of the present disclosure can be preferably applied to a video decoding apparatus that decodes coded data in which image data is coded, and a video coding apparatus that generates coded data in which image data is coded. The embodiments of the present disclosure can be preferably applied to a data structure of coded data generated by the video coding apparatus and referenced by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A video decoding apparatus for decoding an encoded image, the video decoding apparatus comprising:
   matrix reference pixel derivation circuitry that derives reference samples by using top neighboring samples and left neighboring samples of a current block, wherein the top neighboring samples and the left neighboring samples are derived by performing a down-sampling process;
   weight matrix derivation circuitry that derives a weight matrix, which is defined by using a prediction size;
   matrix prediction image derivation circuitry that derives an intermediate prediction image, which is defined by using the prediction size; and
   matrix prediction image interpolation circuitry that derives a predicted image by using the intermediate prediction image,
   wherein:
   the prediction size is less than or equal to a minimum size of a transform block width and a transform block height,
   the weight matrix has a dimension whose number of elements is equal to the prediction size multiplied by the prediction size, and
   the intermediate prediction image is derived as:

$$\text{predMip}[x][y]=(((\Sigma\text{mWeight}[i][y*\text{predSize}+x]* p[i])+oW)>>sW)+\text{pTemp}[0],$$

wherein mWeight represents the weighting matrix, predsize represents the prediction size, p[ ] represents sample values dervied by using the reference samples, oW represents an offset value, sW represents a shift value, and pTemp[ ] represents the reference samples.

2. A video encoding apparatus for encoding a video image, the video encoding apparatus comprising:
   matrix reference pixel derivation circuitry that derives reference samples by using top neighboring samples and left neighboring samples of a current block, wherein the top neighboring samples and the left neighboring samples are derived by performing a down-sampling process;
   weight matrix derivation circuitry that derives a weight matrix, which is defined by using a prediction size;
   matrix prediction image derivation circuitry that derives an intermediate prediction image, which is defined by using the prediction size; and
   matrix prediction image interpolation circuitry that derives a predicted image by using the intermediate prediction image,
   wherein:
   the prediction size is less than or equal to a minimum size of a transform block width and a transform block height,
   the weight matrix has a dimension whose number of elements is equal to the prediction size multiplied by the prediction size, and
   the intermediate prediction image is derived as:

$$\text{predMip}[x][y]=(((\Sigma\text{mWeight}[i][y*\text{predSize}+x]* p[i])+oW)>>sW)+\text{pTemp}[0],$$

wherein mWeight represents the weighting matrix, predsize represents the prediction size, p[ ] represents sample values derived by using the reference samples, oW represents an offset value, sW represents a shift value, and pTemp[ ] represents the reference samples.

3. A video decoding method for decoding an encoded image, the video decoding method including:

deriving reference samples by using top neighboring samples and left neighboring samples of a current block, wherein the top neighboring samples and the left neighboring samples are derived by performing a down-sampling process;

deriving a weight matrix, which is defined by using a prediction size;

deriving an intermediate prediction image, which is defined by using the prediction size; and deriving a predicted image by using the intermediate prediction image, wherein:

the prediction size is less than or equal to a minimum size of a transform block width and a transform block height, the weight matrix has a dimension whose number of elements is equal to the prediction size multiplied by the prediction size, and the intermediate prediction image is derived as:

$$predMip[x][y]=(((\Sigma mWeight[i][y*predSize+x]* p[i])+oW)>>sW)+pTemp[0],$$

wherein mWeight represents the weighting matrix, predsize represents the prediction size, p[ ] represents sample values derived by using the reference samples, oW represents an offset value, sW represents a shift value, and pTemp[ ] represents the reference samples.

\* \* \* \* \*